US012722702B2

(12) United States Patent
Iida et al.

(10) Patent No.: US 12,722,702 B2
(45) Date of Patent: Sep. 1, 2026

(54) PARKING ASSISTANCE DEVICE AND PARKING ASSISTANCE METHOD

(71) Applicant: Panasonic Automotive Systems Co., Ltd., Kanagawa (JP)

(72) Inventors: Takuma Iida, Kanagawa Ken (JP); Shota Akaura, Kanagawa Ken (JP); Takafumi Tokuhiro, Kanagawa Ken (JP); Yukihiro Tanizoe, Osaka Fu (JP)

(73) Assignee: Panasonic Automotive Systems Co., Ltd., Kanagawa (JP)

(*) Notice: Subject to any disclaimer, the term of this patent is extended or adjusted under 35 U.S.C. 154(b) by 22 days.

(21) Appl. No.: 18/734,371

(22) Filed: Jun. 5, 2024

(65) Prior Publication Data

US 2024/0317313 A1 Sep. 26, 2024

Related U.S. Application Data

(63) Continuation of application No. PCT/JP2022/026733, filed on Jul. 5, 2022.

(30) Foreign Application Priority Data

Dec. 24, 2021 (JP) ................................ 2021-211302

(51) Int. Cl.
*B62D 15/02* (2006.01)
*B60W 30/06* (2006.01)
(Continued)

(52) U.S. Cl.
CPC ......... *B62D 15/0285* (2013.01); *B60W 30/06* (2013.01); *B60W 50/14* (2013.01); *B60W 60/00* (2020.02); *G08G 1/16* (2013.01)

(58) Field of Classification Search
None
See application file for complete search history.

(56) References Cited

U.S. PATENT DOCUMENTS 9,140,553 B2 * 9/2015 Grimm ................. B60W 30/06
10,423,162 B2 * 9/2019 Yalla .................... G05D 1/0225
(Continued)

FOREIGN PATENT DOCUMENTS

CN 109933063 A * 6/2019 ...... B60W 30/18036
CN 112572415 A * 3/2021 ............ B60W 30/06
(Continued)

OTHER PUBLICATIONS

International Search Report (ISR) from International Searching Authority (Japan Patent Office) in International Pat. Appl. No. PCT/JP2022/026733, dated Sep. 20, 2022, together with an English language translation.

(Continued)

*Primary Examiner* — Kevin R Steckbauer
(74) *Attorney, Agent, or Firm* — Greenblum & Bernstein, P.L.C.

(57) ABSTRACT

A parking assistance device causes a vehicle to automatically travel based on a travel path in a parking operation in past by a driver, and includes a memory and a processor coupled to the memory. The processor is configured to: acquire at least one of environmental information concerning environment around the vehicle and user information concerning a user who gets on the vehicle; cause the memory to store a plurality of travel paths in association with at least one of the environmental information and the user information; specify a travel path on which the vehicle automatically travels based on at least one of the environmental information and the user information among the stored plurality of travel paths; cause a display unit to display information for urging the driver to approve the specified travel path; and cause the vehicle to travel based on the travel path approved by the driver.

20 Claims, 16 Drawing Sheets

(51) Int. Cl.

| | |
|---|---|
| ***B60W 50/14*** | (2020.01) |
| ***B60W 60/00*** | (2020.01) |
| ***G08G 1/16*** | (2006.01) |

(56) References Cited

U.S. PATENT DOCUMENTS

| | | | | |
|---|---|---|---|---|
| 10,597,043 | B2 * | 3/2020 | Kim | B60W 30/06 |
| 10,850,743 | B2 * | 12/2020 | Kirstein | B60W 50/14 |
| 11,577,755 | B2 * | 2/2023 | Domahidi | B62D 15/027 |
| 11,584,362 | B2 * | 2/2023 | Max | B60W 30/0953 |
| 11,938,969 | B2 * | 3/2024 | Botea | G08G 1/202 |
| 12,037,026 | B2 * | 7/2024 | Domahidi | B60W 60/0027 |
| 2013/0085637 | A1 * | 4/2013 | Grimm | B60W 30/06 701/25 |
| 2018/0043905 | A1 * | 2/2018 | Kim | B60W 30/06 |
| 2018/0244287 | A1 * | 8/2018 | Kirstein | G06F 3/0482 |
| 2018/0321685 | A1 * | 11/2018 | Yalla | G05D 1/0225 |
| 2019/0066514 | A1 | 2/2019 | Yamamura | |
| 2019/0310624 | A1 * | 10/2019 | Bettger | B62D 1/00 |
| 2020/0290599 | A1 | 9/2020 | Noguchi et al. | |
| 2021/0162986 | A1 * | 6/2021 | Sakai | B60W 30/06 |
| 2021/0284131 | A1 * | 9/2021 | Max | G05D 1/0214 |
| 2021/0316763 | A1 * | 10/2021 | Domahidi | B60W 40/105 |
| 2022/0227387 | A1 | 7/2022 | Ozaki et al. | |
| 2023/0150548 | A1 * | 5/2023 | Domahidi | B62D 15/027 |
| 2024/0262229 | A1 * | 8/2024 | Iida | B60L 53/66 |
| 2024/0317313 | A1 * | 9/2024 | Iida | B60W 60/00 |
| 2025/0171014 | A1 * | 5/2025 | Okabe | B60W 50/14 |
| 2025/0209919 | A1 * | 6/2025 | Jeong | B60W 30/06 |

FOREIGN PATENT DOCUMENTS

| | | | | | |
|---|---|---|---|---|---|
| CN | 109863074 | B | * | 10/2021 | B60W 30/06 |
| CN | 114999205 | B | * | 12/2023 | B60W 30/06 |
| CN | 118451017 | A | * | 8/2024 | G08G 1/16 |
| CN | 112572415 | B | * | 9/2024 | G08G 1/14 |
| DE | 10354661 | A1 | * | 6/2005 | B62D 15/0285 |
| DE | 102013015348 | A1 | * | 4/2014 | B62D 1/02 |
| DE | 102013015349 | A1 | * | 4/2014 | B62D 15/0285 |
| DE | 112022006164 | T5 | * | 1/2025 | G08G 1/16 |
| JP | 2013-530867 | | | 8/2013 | |
| JP | 2015-214223 | | | 12/2015 | |
| JP | 6022447 | | | 11/2016 | |
| JP | 2018-086928 | | | 6/2018 | |
| JP | 2018086928 | A | * | 6/2018 | |
| JP | 2019-038493 | | | 3/2019 | |
| JP | 2020-149225 | | | 9/2020 | |
| JP | 2022133230 | A | * | 9/2022 | B60W 30/06 |
| JP | 2023090087 | A | * | 6/2023 | B60W 50/14 |
| JP | 7316697 | B2 | * | 7/2023 | B60W 50/14 |
| JP | 2023095423 | A | * | 7/2023 | G08G 1/16 |
| JP | 2023126711 | A | * | 9/2023 | B60W 50/14 |
| WO | 2006/064544 | | | 6/2006 | |
| WO | 2021/002219 | | | 1/2021 | |
| WO | WO-2023112489 | A1 | * | 6/2023 | B60W 50/14 |
| WO | WO-2023119698 | A1 | * | 6/2023 | G08G 1/16 |

OTHER PUBLICATIONS

Office Action from Japan Patent Office (JPO) in Japanese Patent Appl. No. 2021-211302, dated Jul. 29, 2025, together with an English language translation.

Office Action from Japan Patent Office (JPO) in Japanese Patent Appl. No. 2021-211302, dated Jan. 6, 2026, together with an English language translation.

* cited by examiner

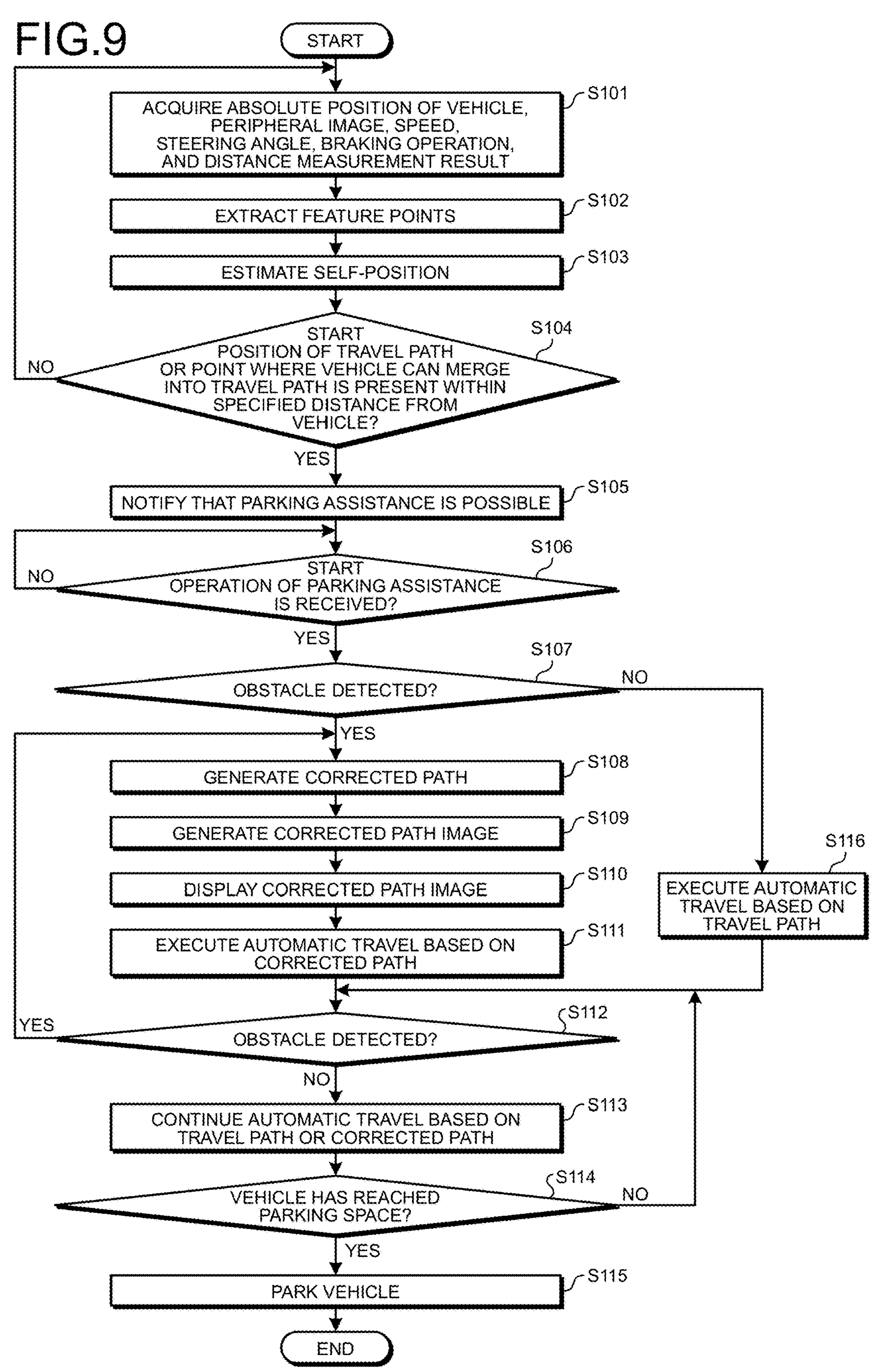
FIG.9
START
ACQUIRE ABSOLUTE POSITION OF VEHICLE, PERIPHERAL IMAGE, SPEED, STEERING ANGLE, BRAKING OPERATION, AND DISTANCE MEASUREMENT RESULT
S101
EXTRACT FEATURE POINTS
S102
ESTIMATE SELF-POSITION
S103
START POSITION OF TRAVEL PATH OR POINT WHERE VEHICLE CAN MERGE INTO TRAVEL PATH IS PRESENT WITHIN SPECIFIED DISTANCE FROM VEHICLE?
S104
NO
YES
NOTIFY THAT PARKING ASSISTANCE IS POSSIBLE
S105
START OPERATION OF PARKING ASSISTANCE IS RECEIVED?
S106
NO
YES
OBSTACLE DETECTED?
S107
NO
YES
GENERATE CORRECTED PATH
S108
GENERATE CORRECTED PATH IMAGE
S109
DISPLAY CORRECTED PATH IMAGE
S110
EXECUTE AUTOMATIC TRAVEL BASED ON CORRECTED PATH
S111
EXECUTE AUTOMATIC TRAVEL BASED ON TRAVEL PATH
S116
OBSTACLE DETECTED?
S112
YES
NO
CONTINUE AUTOMATIC TRAVEL BASED ON TRAVEL PATH OR CORRECTED PATH
S113
VEHICLE HAS REACHED PARKING SPACE?
S114
NO
YES
PARK VEHICLE
S115
END

| TRAVEL PATH NUMBER | CONDITIONS CONCERNING ENVIRONMENTAL INFORMATION | CONDITIONS CONCERNING USER INFORMATION |
|---|---|---|
| 1 | PERIPHERAL FEATURE POINTS: xxx,<br>PRESENCE OR ABSENCE OF OBSTACLE: ABSENT,<br>WEATHER: CLEAR OR CLOUDY | HEALTHY PERSON,<br>AGE: TEENS TO SIXTIES |
| 2 | PERIPHERAL FEATURE POINTS: xxx,<br>PRESENCE OR ABSENCE OF OBSTACLE: ABSENT,<br>WEATHER: RAIN | WHEELCHAIR USER,<br>AGE: SEVENTIES OR OVER |
| ⋮ | ⋮ | ⋮ |

| USER ID | BODY INFORMATION | AGE |
| --- | --- | --- |
| U001 | HEALTHY PERSON | 25 |
| U002 | WHEELCHAIR USER | 40 |
| U003 | HEALTHY PERSON | 75 |
| ... | | ... |

DO YOU EXIT GARAGE ON THIS TRAVEL PATH?
M2
122
200
210
28
STOP POSITION
1
80
24
25
1
27
18
20
21
19
OK
CANCEL
231
232

M3
PLEASE SELECT TRAVEL PATH
123
200
210
TRAVEL PATH 1
28a
STOP POSITION
1
80a
1
27
18
24
25
20
21
19
TRAVEL PATH 2
28b
STOP POSITION
1
80b
1
27
18
24
25
20
21
19
DETERMINE
233

| VEHICLE ID | RESERVATION TIME | USER ID |
|---|---|---|
| V001 | 10:00 TO 12:00 | U001, U005, U007 |
| V002 | 13:00 TO 15:00 | U002 |
| ⋮ | ⋮ | ⋮ |

| TRAVEL PATH NUMBER | USER ID |
|---|---|
| 1 | U001, U003 |
| 2 | U002 |
| ⋮ | ⋮ |

PARKING ASSISTANCE DEVICE AND PARKING ASSISTANCE METHOD

CROSS-REFERENCE TO RELATED APPLICATIONS

This application is a continuation of International Application No. PCT/JP2022/026733, filed Jul. 5, 2022, which claims the benefit of priority from Japanese Application No. 2021-211302, filed on Dec. 24, 2021, the entire contents of which are incorporated herein by reference.

FIELD

Embodiments described herein relate generally to a parking assistance device and a parking assistance method.

BACKGROUND

There has been known a path-memory automatic parking technique for recording a travel path based on teacher traveling by a driver and causing a vehicle to automatically travel based on the recorded travel path. The technique is used, for example, when entering or exiting a parking lot.

Some vehicles that perform such the path-memory automatic parking have a function of automatically performing a detour operation for, when detecting a stationary unknown obstacle, stopping the vehicle or avoiding the obstacle. Conventional technologies are described in Japanese Patent No. 6022447, for example.

However, when a vehicle travels on a path different from a pre-registered travel path for, for example, detouring an obstacle or the like, it has been likely that a user cannot grasp the path and the user's benefit is impaired.

The present disclosure provides a parking assistance device and a parking assistance method, which can reduce impairment of a user's convenience even when a vehicle travels on a path different from a pre-registered travel path.

SUMMARY

A parking assistance device according to the present disclosure causes a vehicle to automatically travel based on a travel path in a parking operation in past by a driver, and includes a memory and a processor coupled to the memory. The processor is configured to: acquire at least one of environmental information concerning environment around the vehicle and user information concerning a user who gets in the vehicle; cause the memory to store a plurality of travel paths in association with at least one of the environmental information and the user information; specify a travel path on which the vehicle automatically travels based on at least one of the environmental information and the user information among the stored plurality of travel paths; cause a display unit to display information for urging the driver to approve the specified travel path; and cause the vehicle to travel based on the travel path approved by the driver.

BRIEF DESCRIPTION OF THE DRAWINGS

FIG. 9 is a flowchart illustrating an example of a flow of processing of automatic travel and correction of a travel path executed by the parking assistance device according to the first embodiment;

FIG. 12 is a diagram illustrating an example of a travel path database according to the second embodiment;

FIG. 13 is a diagram illustrating an example of a user information database according to the second embodiment;

FIG. 18 is a diagram illustrating an example of a use schedule database stored in a cloud server according to the modification 1 of the second embodiment; and FIG. 19 is a diagram illustrating an example of a travel path database according to a modification 2 of the second embodiment.

DETAILED DESCRIPTION

Embodiments of a parking assistance method and a parking assistance device according to the present disclosure will be explained below with reference to the accompanying drawings.

First Embodiment

Figure 1:
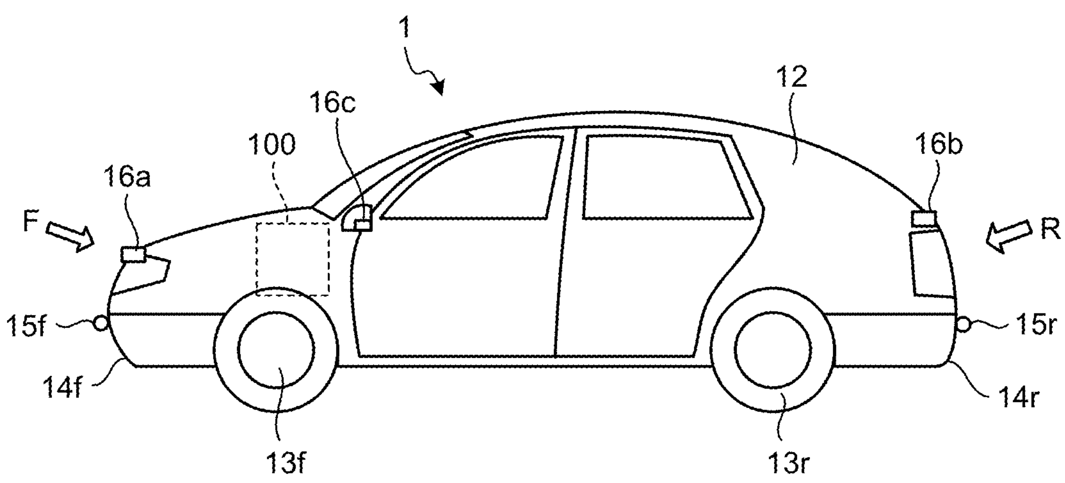
FIG. 1 is a diagram illustrating an example of a vehicle including a parking assistance device according to a first embodiment.

FIG. 1 is a diagram illustrating an example of a vehicle 1 including a parking assistance device 100 according to a first embodiment. As illustrated in FIG. 1, the vehicle 1 includes a vehicle body 12 and two pairs of wheels 13 disposed along a predetermined direction in the vehicle body 12. The two pairs of wheels 13 include a pair of front tires **13*f* and a pair of rear tires 13*r***.

The front tire **13*f* illustrated in FIG. 1 is an example of a first wheel in the present embodiment. The rear tire 13*r* is an example of a second wheel in the present embodiment. The two front tires 13*f* and the two rear tires 13*r* of the vehicle 1 are collectively referred to as wheels 13. Note that, although the vehicle 1 illustrated in FIG. 1 includes four wheels 13, the number of wheels 13 is not limited thereto. For example, the vehicle 1** may be a two-wheeled vehicle.

The vehicle body 12 is coupled to the wheels 13 and is movable by the wheels 13. In this case, the predetermined direction in which the two pairs of wheels 13 are disposed is a traveling direction of the vehicle 1. The vehicle 1 can move forward or backward by, for example, switching not-illustrated gears. The vehicle 1 can also turn to the right and the left according to steering.

The vehicle body 12 has a front end portion F, which is an end portion on the front tire **13*f* side, and a rear end portion R, which is an end portion on the rear tire 13*r* side. The vehicle body 12 has a substantially rectangular shape in top view. Four corners of the substantially rectangular shape are sometimes referred to as end portions. Although not illustrated in FIG. 1, the vehicle 1** includes a display device, a speaker, a microphone, and an operation unit.

A pair of bumpers 14 is provided at the front and rear end portions F and R of the vehicle body 12 and near the lower end of the vehicle body 12. Of the pair of bumpers 14, a front bumper **14*f* covers an entire front surface and a part of side surfaces near the lower end portion of the vehicle body 12. Of the pair of bumpers 14, a rear bumper 14*r* covers an entire rear surface and a part of the side surfaces near the lower end portion of the vehicle body 12**.

Wave transmitter/receivers **15*f* and 15*r* that transmit and receive sound waves such as ultrasonic waves are disposed at predetermined end portions of the vehicle body 12. For example, one or more wave transmitter/receivers 15*f* are disposed in the front bumper 14*f* and one or more wave transmitter/receivers 15*r* are disposed in the rear bumper 14*r*. In the following explanation, when not being particularly limited, the wave transmitter/receivers 15*f* and 15*r* are simply referred to as wave transmitter/receivers 15. In addition, the number and the positions of the wave transmitter/receivers 15 are not limited to the example illustrated in FIG. 1. For example, the vehicle 1 may include the wave transmitter/receivers 15** on the left and right sides.

In the present embodiment, sonars using ultrasonic waves are explained as an example of the wave transmitter/receivers 15. However, the wave transmitter/receivers 15 may be radars that transmits and receives electromagnetic waves. Alternatively, the vehicle 1 may include both of the sonars and the radars. The wave transmitter/receivers 15 may be simply referred to as sensors.

The wave transmitter/receivers 15 detect an obstacle around the vehicle 1 based on a result of transmission and reception of a sound wave or an electromagnetic wave. The wave transmitter/receivers 15 measure the distance between the obstacle around the vehicle 1 and the vehicle 1 based on the result of transmission and reception of the sound wave or the electromagnetic wave.

The vehicle 1 includes a first in-vehicle camera **16*a* that images the front of the vehicle 1, a second in-vehicle camera 16*b* that images the rear of the vehicle 1, a third in-vehicle camera 16*c* that images the left side of the vehicle 1, and a fourth in-vehicle camera that images the right side of the vehicle 1**. The fourth in-vehicle camera is not illustrated.

In the following explanation, when not being particularly distinguished, the first in-vehicle camera **16*a*, the second in-vehicle camera 16*b*, the third in-vehicle camera 16*c*, and the fourth in-vehicle camera are simply referred to as in-vehicle cameras 16. The positions and the number of the in-vehicle cameras are not limited to the example illustrated in FIG. 1. For example, the vehicle 1 may also include only two in-vehicle cameras, that is, the first in-vehicle camera 16*a* and the second in-vehicle camera 16*b*. Alternatively, the vehicle 1** may further include other in-vehicle cameras besides the example explained above.

The in-vehicle cameras 16 are capable of capturing videos of the periphery of the vehicle 1 and are, for example, cameras that capture color images. Note that captured images captured by the in-vehicle cameras 16 may be moving images or still images. For example, the in-vehicle cameras 16 may be cameras incorporated in the vehicle 1 or may be cameras of a drive recorder retrofitted to the vehicle 1.

A parking assistance device 100 is mounted on the vehicle 1. The parking assistance device 100 is an information processing device that can be mounted on the vehicle 1 and is, for example, an ECU (Electronic Control Unit) or an OBU (On Board Unit) provided inside the vehicle 1. Alternatively, the parking assistance device 100 may be an external device installed near the dashboard of the vehicle 1. Note that the parking assistance device 100 may also serve as a car navigation device or the like.

The parking assistance device 100 in the present embodiment learns a travel path based on teacher traveling by a driver and performs parking assistance using a result of the learning. Such parking assistance is effective for reducing the labor of parking of the driver when parking is repeatedly performed at a predetermined parking position such as a garage of the driver's home, a contracted parking position of an apartment building, or a specified parking position in a parking lot of a work place or the like. Such parking assistance is called home zone parking or path-memory automatic parking.

Besides the configuration illustrated in FIG. 1, the vehicle 1 may include various sensors such as a gyro sensor and a wheel speed sensor not illustrated in FIG. 1. The gyro sensor measures rotational behaviors of the vehicle 1 such as front, rear, left, and right rotation and turn. The wheel speed sensor measures wheel speed of the wheels 13 of the vehicle 1.

Figure 2:
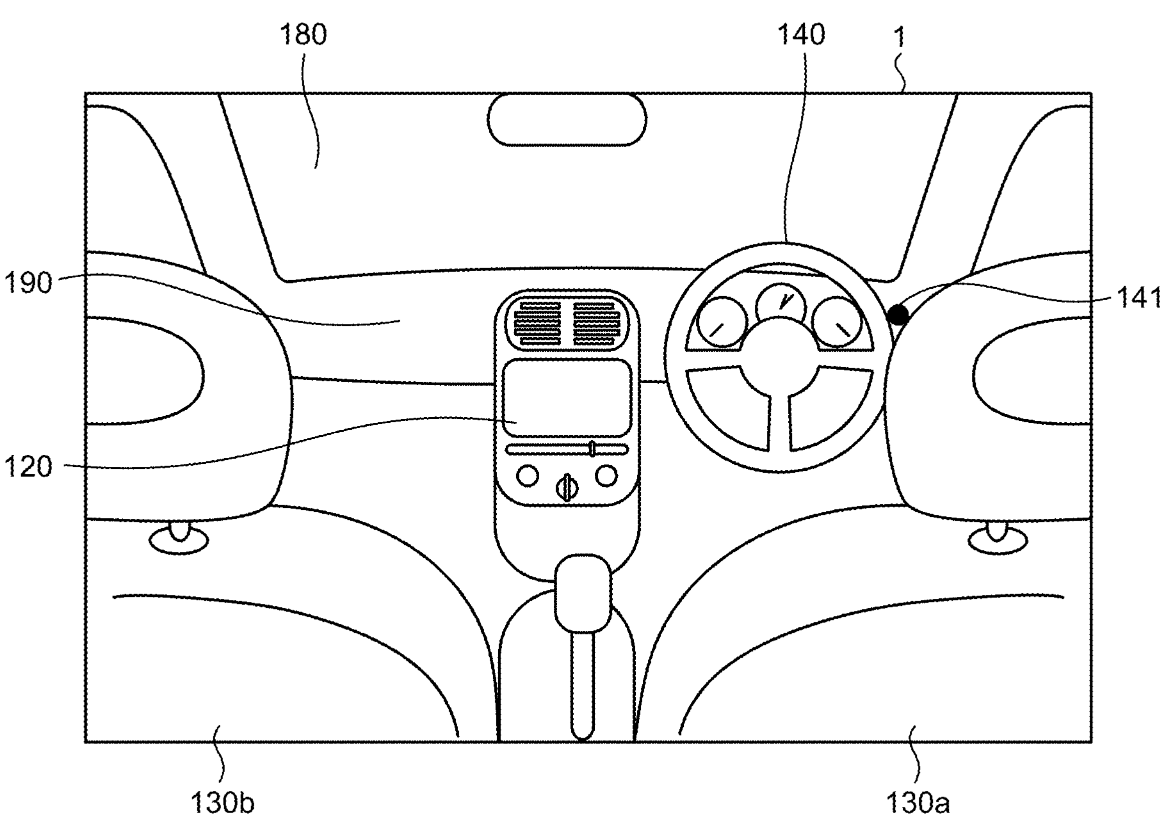
FIG. 2 is a diagram illustrating an example of a configuration near a driver's seat of the vehicle according to the first embodiment.

Next, a configuration in the vicinity of the driver's seat of the vehicle 1 in the present embodiment is explained. FIG. 2 is a diagram illustrating an example of a configuration in the vicinity of a driver's seat **130*a* of the vehicle 1** according to the first embodiment.

As illustrated in FIG. 2, the vehicle 1 includes the driver's seat **130*a* and a passenger seat 130*b*. A windshield 180, a dashboard 190, a steering wheel 140, a display device 120, and an operation button 141 are provided in the front of the driver's seat 130*a***.

The display device 120 is a display provided on the dashboard 190 of the vehicle 1. As an example, the display device 120 is located at the center of the dashboard 190 as illustrated in FIG. 2. The display device 120 is, for example, a liquid crystal display or an EL (Electro Luminescence) display. The display device 120 may also serve as a touch panel. The display device 120 is an example of a display unit in the present embodiment.

The steering wheel 140 is provided in the front of the driver's seat **130*a* and can be operated by the driver. A rotation angle of the steering wheel 140, that is, a steering angle is electrically or mechanically interlocked with a change in the direction of the front tires 13*f*, which are steering wheels. Note that the steering wheels may be the rear tires 13***r*, or both the front tires 13*f* and the rear tires 13*r* may be the steering wheels.

The operation button 141 is a button capable of receiving operation by a user. Note that, in the present embodiment, the user is, for example, the driver of the vehicle 1. Note that the position of the operation button 141 is not limited to the example illustrated in FIG. 2. The operation button 141 may be provided, for example, on the steering wheel 140. Although one operation button 141 is illustrated in FIG. 2, a plurality of operation buttons 141 may be provided. The operation button 141 is an example of an operation unit. When the display device 120 also serves as a touch panel, the display device 120 may be an example of the operation unit.

Next, a hardware configuration of the parking assistance device 100 is explained.

Figure 3:
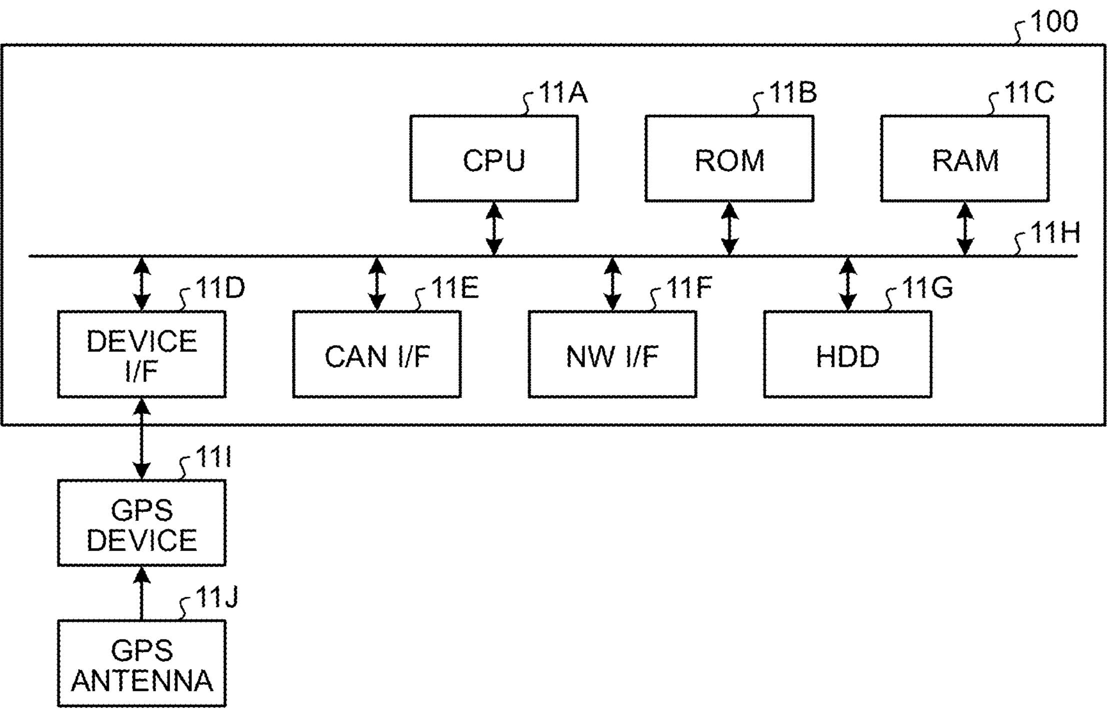
FIG. 3 is a diagram illustrating an example of a hardware configuration of the parking assistance device according to the first embodiment.

FIG. 3 is a diagram illustrating an example of a hardware configuration of the parking assistance device 100 according to the first embodiment. As illustrated in FIG. 3, the parking assistance device 100 has a hardware configuration in which a CPU (Central Processing Unit) 11A, a ROM 11B, a RAM 11C, a device I/F (interface) 11D, a CAN (Controller Area Network) I/F 11E, a NW (Network) I/F 11F, a HDD (Hard Disk Drive) 11G, and the like are connected to one another via a bus 11H and a normal computer is used.

The CPU 11A is an arithmetic device that controls the entire parking assistance device 100. Note that the CPU 11A is an example of a processor in the parking assistance device 100 in the present embodiment. Another processor or a processing circuit may be provided instead of the CPU 11A.

The ROM 11B, the RAM 11C, and the HDD 11G function as storage units. For example, the ROM 11B stores a program and the like that implement various kinds of processing by the CPU 11A. The RAM 11C is, for example, a main storage device of the parking assistance device 100 and stores data necessary for the various kinds of processing by the CPU 11A.

The device I/F 11D is an interface connectable to various devices. For example, the device I/F 11D is connected to a GPS device 111 and acquires GPS position information indicating the current position of the vehicle 1 from the GPS device 111. The GPS position information is, for example, values of latitude and longitude indicating the absolute position of the vehicle 1.

The GPS device 111 is a device that specifies a GPS coordinate representing the position of the vehicle 1 based on a GPS signal received by a GPS antenna 11J. The GPS antenna 11J is an antenna capable of receiving a GPS signal.

The device I/F 11D acquires images, detection results, and the like from the in-vehicle cameras 16 and the wave transmitter/receivers 15. The device I/F 11D may acquire measurement results from the gyro sensor and the wheel speed sensor not illustrated in FIG. 3 mounted on the vehicle 1.

The CAN I/F 11E is an interface for transmitting and receiving information to and from another ECU mounted on the vehicle 1 via a CAN in the vehicle 1. Note that a communication standard other than the CAN may be adopted.

The NW I/F 11F is a communication device capable of communicating with an information processing device outside the vehicle 1 via a network. The NW I/F 11F is capable of communicating with an information processing device outside the vehicle 1 by, for example, a public line such as an LTE (Long Term Evolution) (registered trademark) or near field communication such as Wi-Fi (registered trademark) or Bluetooth (registered trademark). Note that a communication format between the vehicle 1 and the information processing device outside the vehicle 1 is not limited thereto. The information processing device outside the vehicle 1 is, for example, a server or a mobile terminal such as a smartphone.

Note that, in FIGS. 1 to 3, the display device 120 is illustrated as a device separate from the parking assistance device 100. However, the display device 120 may be included in the parking assistance device 100.

In addition, the parking assistance device 100 may include a speaker and a microphone not illustrated in FIG. 3 in addition to the components illustrated in FIG. 3. Alternatively, the device I/F 11D of the parking assistance device 100 may input and output voice data to and from the speaker and the microphone not illustrated in FIG. 3 provided in the vehicle 1 as the devices separate from the parking assistance device 100.

The parking assistance device 100 in the present embodiment learns a travel path based on teacher traveling by a driver and performs parking assistance using a result of the learning. In other words, a parking assistance method executed by the parking assistance device 100 is a method of performing automatic travel of the vehicle 1 based on the teacher traveling by the driver. Such a parking assistance method is effective for reducing the labor of parking of the driver when parking is repeatedly performed at a predetermined parking position such as a garage of the driver's home, a contracted parking position of an apartment building, or a specified parking position in a parking lot of a work place or the like.

Figure 4:
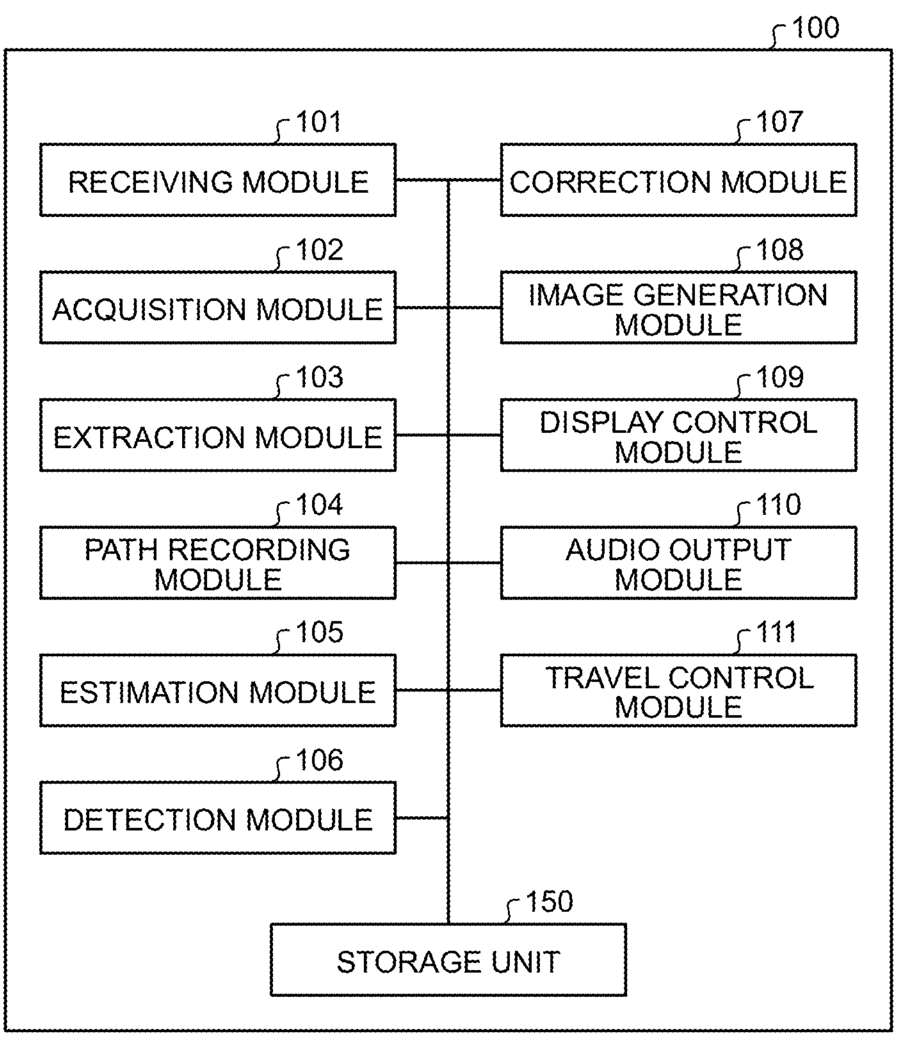
FIG. 4 is a block diagram illustrating an example of functions included in the parking assistance device according to the first embodiment.

Next, details of the functions of the parking assistance device 100 in the present embodiment are explained. FIG. 4 is a block diagram illustrating an example of functions included in the parking assistance device 100 according to the first embodiment.

As illustrated in FIG. 4, the parking assistance device 100 in the present embodiment includes a receiving module 101, an acquisition module 102, an extraction module 103, a path recording module 104, an estimation module 105, a detection module 106, a correction module 107, an image generation module 108, a display control module 109, an audio output module 110, a travel control module 111, and a storage unit 150.

The storage unit 150 is configured by, for example, a ROM 11B, a RAM 11C, or an HDD 11G. Note that, although one storage unit 150 is illustrated as being included in the parking assistance device 100 in FIG. 4, a plurality of storage media may function as the storage unit 150.

The storage unit 150 stores programs and data used in various kinds of processing to be executed by the parking assistance device 100. For example, a program to be executed by the parking assistance device 100 in the present embodiment has a module configuration including the functional units explained above (the receiving module 101, the acquisition module 102, the extraction module 103, the path recording module 104, the estimation module 105, the detection module 106, the correction module 107, the image generation module 108, the display control module 109, the audio output module 110, and the travel control module 111). As actual hardware, the CPU 11A reads the program from the storage unit 150 and executes the program, whereby the respective units are loaded on the RAM 11C, and the receiving module 101, the acquisition module 102, the extraction module 103, the path recording module 104, the estimation module 105, the detection module 106, the correction module 107, the image generation module 108, the display control module 109, the audio output module 110, and the travel control module 111 are generated on the RAM 11C. Note that the kinds of processing realized by the functional units of the parking assistance device 100 are also referred to as steps.

The program to be executed by the parking assistance device 100 in the present embodiment is provided by being recorded in a computer-readable recording medium such as a flash memory, a CD-ROM, a flexible disk (FD), a CD-R, or a DVD (Digital Versatile Disk) as a file in an installable format or an executable format.

The program to be executed by the parking assistance device 100 in the present embodiment may be configured to be stored on a computer connected to a network such as the Internet and provided by being downloaded via the network. The program to be executed by the parking assistance device 100 in the present embodiment may be provided or distributed via a network such as the Internet. The program to be executed by the parking assistance device 100 in the present embodiment may be provided by being incorporated in the ROM 11B or the like in advance.

The receiving module 101 receives various kinds of operation from the user. For example, when the operation button 141 or the image button on the touch panel is pressed, the receiving module 101 receives operation of starting and ending the recording of the teacher traveling by the user. The receiving module 101 may receive various kinds of operation by the user by voice of the user input from the microphone provided in the vehicle 1.

The acquisition module 102 acquires, from the plurality of in-vehicle cameras 16*a* to 16*c*, a plurality of images obtained by imaging the periphery of the vehicle 1 in time series as the vehicle 1 moves. Note that, since the image is an image obtained by imaging the periphery of the vehicle 1, the image is referred to as a peripheral image in the present embodiment.

The acquisition module 102 acquires information concerning the distance between an object around the vehicle 1 and the vehicle. The information concerning the distance between the object around the vehicle 1 and the vehicle is, for example, the presence or absence of an obstacle detected by the wave transmitter/receiver 15 and the length of the distance between the detected obstacle around the vehicle 1 and the vehicle 1. The presence or absence of an obstacle detected by the wave transmitter/receiver 15, the distance between the obstacle around the vehicle 1 and the vehicle 1 measured by the wave transmitter/receiver 15, and the peripheral image may be referred to as environmental information concerning the environment around the vehicle 1. Note that the environmental information is not limited to these pieces of information.

The acquisition module 102 acquires GPS position information from the GPS device 111 via the device I/F 11D.

The acquisition module 102 acquires vehicle information of the vehicle 1 from the various sensors or another ECU of the vehicle 1. The vehicle information includes, for example, information concerning speed, a steering angle, and a braking operation of the vehicle 1. The pieces of information included in the vehicle information of the vehicle 1 are stored in the storage unit 150 in association with times when the pieces of information were detected. Note that the vehicle information of the vehicle 1 may further include wheel speed, rotating speed of the wheels 13, or acceleration of the vehicle 1 measured by the gyro sensor or the like.

The extraction module 103 extracts feature points around the vehicle 1 from a peripheral image around the vehicle 1 captured by the in-vehicle camera 16 or a result of sensing the periphery of the vehicle 1 with the wave transmitter/receiver 15. A method of extracting feature points with the extraction module 103 is not particularly limited. A publicly-known method may be applied. For example, the extraction module 103 extracts feature points with a method such as a FAST (Features from Accelerated Segment Test) or an ORB (Oriented FAST and Rotated BRIEF). At the time of learning of a travel path 80, the extraction module 103 may preferentially record feature points that satisfy a specified condition among the extracted feature points. For example, among a plurality of peripheral images continuous in time series, a feature point extracted from a peripheral image having a longer distance traveled by the vehicle 1 during imaging may be preferentially selected as a feature point.

The path recording module 104 records a travel path of the vehicle 1 in the teacher traveling by the driver. The path recording module 104 estimates the position of the vehicle 1 during the teacher traveling based on, for example, changes in the feature points extracted by the extraction module 103 and vehicle information of the vehicle 1 and specifies a travel path from a time-series change in the position.

More specifically, the path recording module 104 specifies a change in the position of the vehicle 1 based on time-series changes in the feature points extracted during the teacher traveling. The path recording module 104 may correct, based on acquired vehicle information, the position of the vehicle 1 specified from the feature points. The path recording module 104 may estimate the position of the vehicle 1 during the teacher traveling from a change in the absolute position of the vehicle 1 based on GPS position information of the vehicle 1.

In the present embodiment, information in which a travel path for automatic travel and speed, a steering angle, a braking operation, and feature points extracted during the teacher traveling of the vehicle 1 traveling on the travel path are associated in time series is referred to as travel path information. Since the travel path of the vehicle 1 is defined by the travel path information, processing of collecting the travel path information is recording processing for the travel path of the vehicle 1. The path recording module 104 stores the travel path information in the storage unit 150. The travel path information or the corrected path information obtained by correcting the travel path information with the correction module 107 explained below is used by the travel control module 111 at the time of automatic travel to be described later. Note that a recording method for the travel path and a definition of the travel path information are not limited to the example explained above.

The path recording module 104 defines environment around the vehicle 1 as map information based on feature points extracted from a peripheral image captured during the teacher traveling and stores the map information in the storage unit 150. Note that the recording processing for the travel path based on the teacher traveling may be referred to as learning processing. The travel path recorded by the teacher traveling is also referred to as reference path because the travel path is used as a reference for correction by the correction module 107 explained below.

Figure 5:
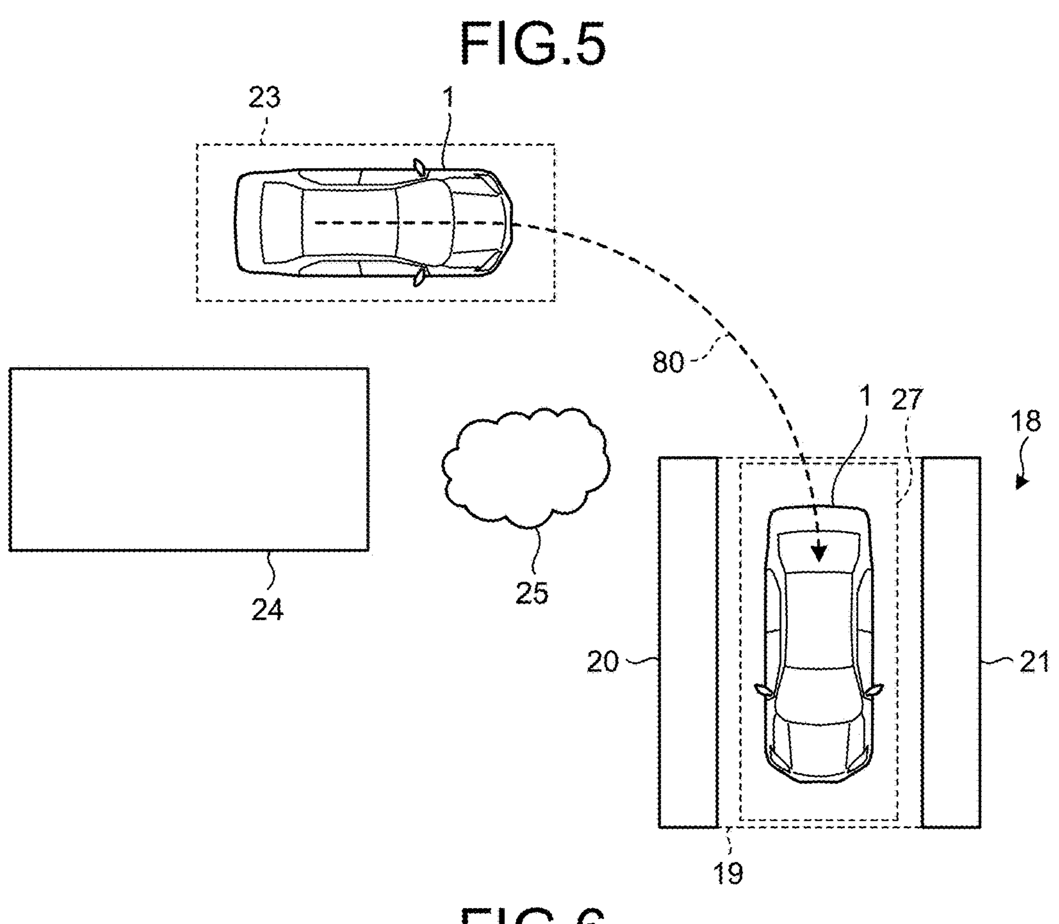
FIG. 5 is a diagram illustrating an example of a travel path recorded by teacher traveling according to the first embodiment.

FIG. 5 is a diagram illustrating an example of the travel path 80 recorded by the teacher traveling according to the first embodiment. In the example illustrated in FIG. 5, the driver of the vehicle 1 moves the vehicle 1 from a start position 23 to a parking position 27 with manual drive at the time of the teacher traveling. The parking position 27 is present, as an example, in a parking space 19 in a garage 18. The garage 18 has sidewalls 20 and 21. In other words, a range of the parking space 19 is delimited by the sidewalls 20 and 21. Note that the parking space 19 is not limited to the inside of the garage 18 and may be, for example, a region, a range of which is delimited by a white line. The position of the parking space 19 may be indicated by a sign or the like. The parking space 19 may be an open space or the like not partitioned by a white line or the like.

In the present embodiment, when the parking assistance device 100 is switched to a learning mode by the driver, the path recording module 104 performs the teacher traveling. The switching to the learning mode is carried out, for example, by the driver operating the operation button 141 or the touch panel.

In the learning mode, the path recording module 104 learns the periphery of the parking space 19. The periphery of the parking space 19 also includes lateral boundaries of the parking space 19, that is, the sidewalls 20 and 21 in FIG. 5. During the teacher traveling in the learning mode, the path recording module 104 starts recording map information of the periphery from the start position 23 of the movement of the vehicle 1 and stores the recorded map information in the storage unit 150.

In the example illustrated in FIG. 5, a building 24 and a tree 25 are located around the parking space 19. The sidewalls 20 and 21, the building 24, and the tree 25 are depicted in a peripheral image and sensed by the wave transmitter/receiver 15. Therefore, the path recording module 104 records feature points of the sidewalls 20 and 21, the building 24, and the tree 25 as map information. In this case, the sidewalls 20 and 21, the building 24, and the tree 25 are known objects. These known objects serve as references for the travel path 80 and are therefore also referred to as reference objects.

Note that, in the present embodiment, the path recording module 104 records information concerning a track or a shape of the travel path 80, a relative position of the start position 23 with respect to a feature point representing an object in the periphery, and a relative position of the parking position 27 with respect to a feature point representing an object in the periphery. Note that information to be recorded is not limited thereto. For example, the path recording module 104 may record only the relative position of the parking position 27 with respect to the feature point representing the object in the periphery and the relative position of the parking position 27 with respect to the feature point representing the object in the periphery without recording the track or the shape of the travel path 80.

Note that map information is not limited to the map information formed by the feature points and the path recording module 104 may record information concerning the relative positions, colors, and contours of a plurality of objects around the parking space 19.

Referring back to FIG. 4, when the vehicle 1 automatically travels based on the travel path 80 or a corrected path 81 with the travel control module 111 explained below, the estimation module 105 estimates the position and the direction of the vehicle 1 based on feature points extracted by the extraction module 103.

For example, the estimation module 105 estimates the position of the vehicle 1 by comparing feature points of a peripheral image captured by the in-vehicle camera 16 during at the time of the teacher traveling with feature points of a current peripheral image. The method of estimating the position and the direction of the vehicle 1 with the estimation module 105 is not limited to this example. The estimation module 105 may correct the estimated position of vehicle 1 based on the absolute position of the vehicle 1 based on GPS position information of the vehicle 1.

The detection module 106 detects an object around the vehicle 1. More specifically, the detection module 106 detects an object around the vehicle 1 based on environmental information such as the presence or absence of an obstacle detected by the wave transmitter/receiver 15, the distance between the obstacle around the vehicle 1 and the vehicle 1 measured by the wave transmitter/receiver 15, and a peripheral image, the environmental information being acquired by the acquisition module 102 before the start of the automatic travel by the parking assistance and during the automatic travel. In the present embodiment, the object includes other vehicles, buildings, trees, people, and the like.

Objects around the vehicle 1 detected during the automatic travel by the parking assistance include known objects present since the time of the teacher traveling and unknown objects absent at the time of the teacher traveling. Among the unknown objects absent at the time of the teacher traveling, an object, the distance of which to the vehicle 1 is equal to or smaller than a threshold when the vehicle 1 travels based on the travel path 80 recorded by the teacher traveling, is an obstacle. The threshold is not particularly limited.

For example, when detecting an object included in map information corresponding to the travel path 80 recorded by the path recording module 104 during the automatic travel by the parking assistance, the detection module 106 determines that a known object has been detected. For example, when detecting an object not included in the map information corresponding to the travel path 80 recorded by the path recording module 104 during the automatic travel by the parking assistance, the detection module 106 determines that an unknown object has been detected.

The correction module 107 corrects, based on a result of the object detection, the travel path 80 recorded by the teacher traveling. More specifically, when the object detected by the detection module 106 is not an object detected in the teacher traveling, the correction module 107 corrects the travel path 80 such that the distance to the object is equal to or greater than the threshold.

Figure 6:
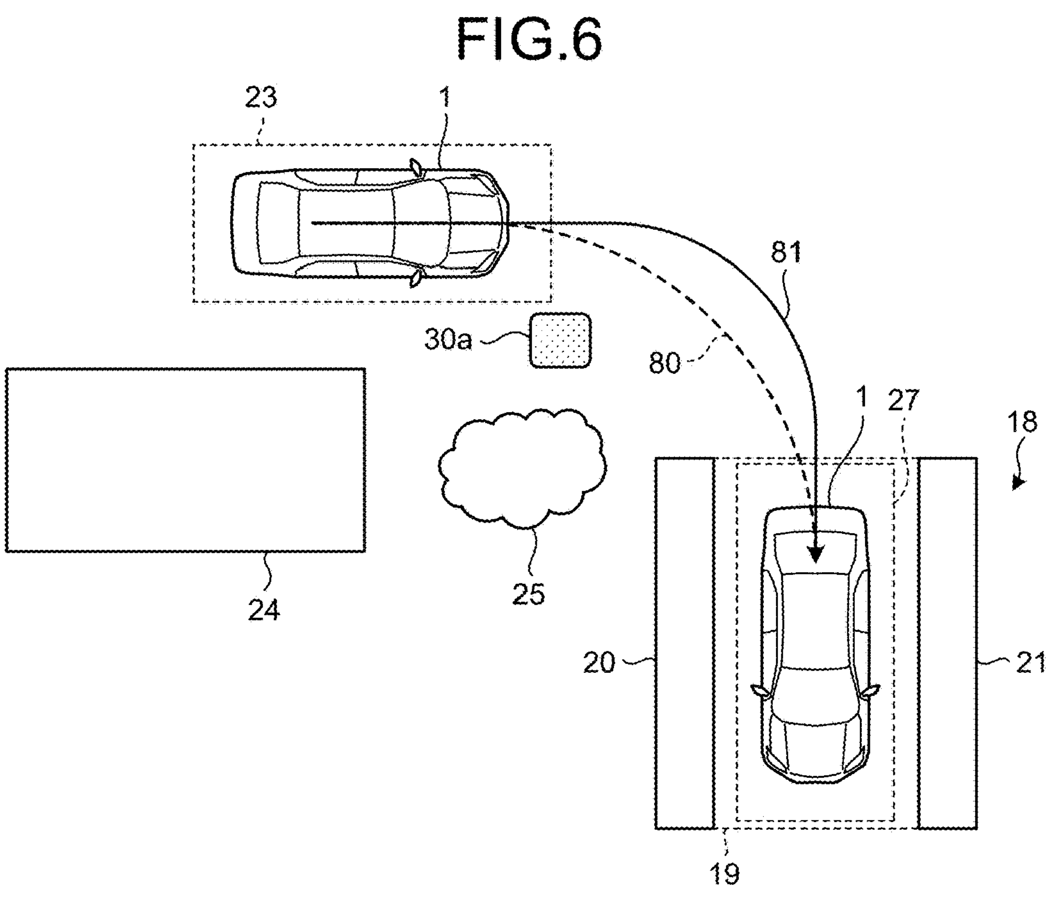
FIG. 6 is a diagram illustrating an example of a corrected path according to the first embodiment.

FIG. 6 is a diagram illustrating an example of the corrected path 81 according to the first embodiment. In the example illustrated in FIG. 6, when the parking assistance device 100 executes parking assistance, a trash box **30*a* is left near the parking space 19. The trash box 30*a* is an unknown object for the parking assistance device 100 because the trash box 30*a* is absent at the time of the teacher traveling. In this case, the trash box 30*a* is detected by the detection module 106. The correction module 107 corrects the travel path 80 such that the distance between the trash box 30*a* and the vehicle 1 continues to be equal to or greater than a threshold while the vehicle 1 moves from the start position 23 to the parking position 27. A travel path corrected by the correction module 107 is referred to as the corrected path 81**.

In the present embodiment, the correction module 107 does not generate an entire path for avoiding trash box **30*a* from the beginning but generates the corrected path 81 by, for example, replacing a partial region of the travel path 80 recorded by the teacher traveling with a new path. For example, in the example illustrated in FIG. 6, the vicinity of a start end and the vicinity of a terminal end of the corrected path 81 overlap the travel path 80 and only an intermediate portion is different from the travel path 80. Therefore, with the correction method in the present embodiment, an unknown object can be avoided even if the entire path for avoiding trash box 30***a* is not generated.

Referring back to FIG. 4, the image generation module 108 generates a corrected path image representing the corrected path 81 generated by the correction module 107. The corrected path image is, for example, an image illustrating the parking space 19, the corrected path 81, the travel path 80, the start position 23 of the travel path 80, the parking position 27, and objects around the parking space 19. The corrected path image may not include the travel path 80. The corrected path image may be generated from a peripheral image captured by the in-vehicle camera 16 or may be an illustration in which a contour or the like of an object is drawn.

The display control module 109 causes the display device 120 to display the travel path 80 corrected by the correction module 107, that is, the corrected path 81 at least before the start of the automatic travel by the parking assistance or during the automatic travel. In the present embodiment, the display control module 109 causes the display device 120 to display the corrected path 81 at least during the automatic travel. Specifically, in the present embodiment, the display control module 109 causes the display device 120 to display a corrected path image generated by the image generation module 108.

Figure 7:
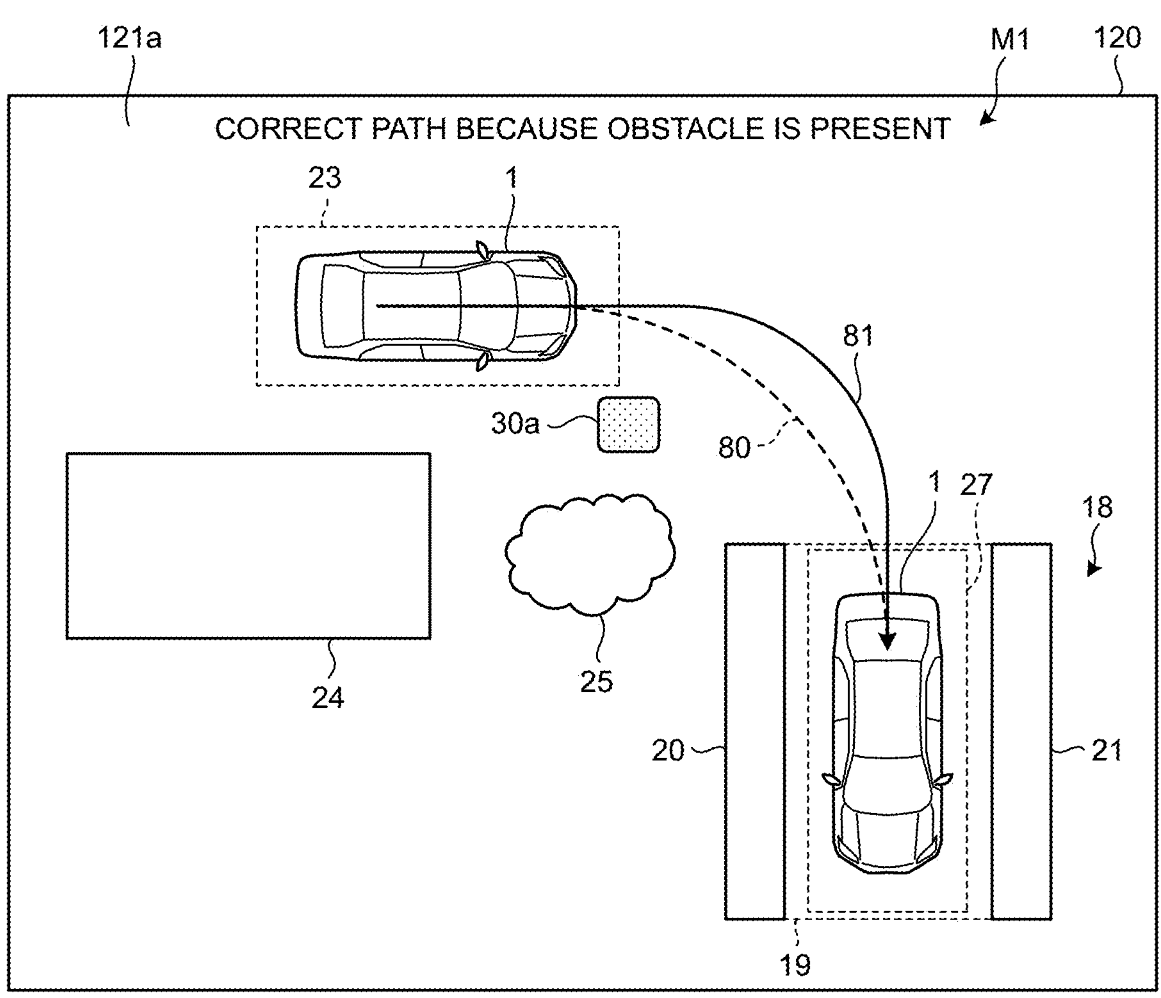
FIG. 7 is a diagram illustrating an example of a corrected path image displayed on a display device according to the first embodiment.

FIG. 7 is a diagram illustrating an example of a corrected path image 121*a* displayed on the display device 120 according to the first embodiment. As illustrated in FIG. 7, the corrected path image 121*a* illustrates the parking space 19, the corrected path 81, the travel path 80, the start position 23 of the travel path 80, the parking position 27, the sidewalls 20 and 21, the building 24, the trees 25, and the trash box 30*a*. Note that, although both of the travel path 80 before the correction and the corrected path 81 are depicted in the corrected path image 121*a* in FIG. 7, only the corrected path 81 may be depicted. The display control module 109 may highlight which object is an obstacle among objects depicted in the corrected path image 121*a*. The display control module 109 may further use an XR (Extended Reality) technology such as AR (Augmented Reality) or CG (Computer Graphics) to display a parking action in a moving image manner to reproduce the parking act. Since an actual behavior of a car is faithfully reproduced by such a technology in the case of a moving image, the behavior is visually easy to understand. The user can more easily determine a risk of an obstacle and the like.

The corrected path image 121*a* may include a message M1 for explaining to the driver a reason for changing the travel path 80. In the example illustrated in FIG. 7, the display control module 109 displays the message M1 "Correct a path because an obstacle is present".

In the example illustrated in FIG. 7, the trash box 30*a* is included in an imaging range of the in-vehicle camera 16 of the vehicle 1 and a measurement range of the wave transmitter/receiver 15 at the point of time of the start position 23 of the travel path 80. Therefore, the display control module 109 can cause the display device 120 to display the corrected path image 121*a* before the start of the automatic travel by the parking assistance.

When the vehicle 1 moves according to the automatic travel, the imaging range of the in-vehicle camera 16 and the measurement range of the wave transmitter/receiver 15 also change. Therefore, an unknown object is sometimes detected anew by the detection module 106. When the unknown object detected anew is an obstacle, the correction module 107 corrects the travel path 80. Alternatively, when the vehicle 1 is automatically traveling along the corrected path 81 already corrected, the correction module 107 further corrects the corrected path 81 to avoid the obstacle detected anew. When the travel path 80 or the corrected path 81 is corrected during the automatic travel as explained above, the image generation module 108 generates a corrected path image representing the corrected path 81 corrected anew. Then, the display control module 109 causes the display device 120 to display the corrected path image generated anew.

Figure 8:
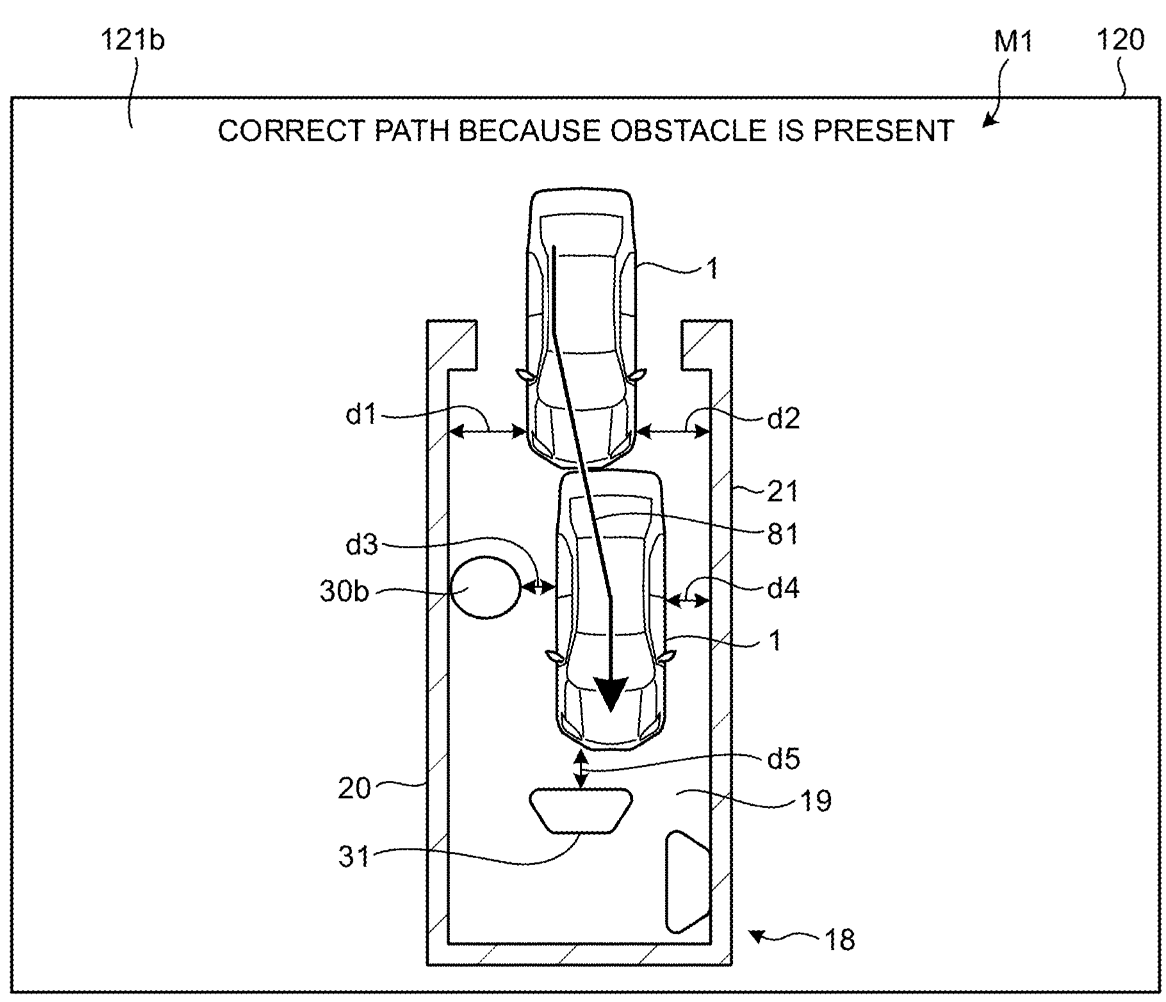
FIG. 8 is a diagram illustrating an example of a corrected path image different from the corrected path image illustrated in FIG. 7.

FIG. 8 is a diagram illustrating an example of a corrected path image 121*b* different from FIG. 7. In the example illustrated in FIG. 8, a trash box 30*b* is left in a garage 18. The trash box 30*b* is assumed to be an unknown object absent in the location at the time of the teacher traveling. Still another unknown object 31 is present in the depth of the garage 18. The trash box 30*b* and the other unknown object 31 are not included in the imaging range of the in-vehicle camera 16 and the measurement range of the wave transmitter/receiver 15 unless the vehicle 1 enters the garage 18.

In this case, when the vehicle 1 enters the garage 18 and the trash box 30*b* and the other unknown object 31 are included in the imaging range of the in-vehicle camera 16 and the measurement range of the wave transmitter/receiver 15, the detection module 106 detects the trash box 30*b* and the other unknown object 31. The detection module 106 also detects the sidewalls 20 and 21 that are known objects.

The correction module 107 corrects the travel path 80 such that distances d3 and d5 to the trash box 30*b* and the other unknown object 31 are longer than a threshold while maintaining a state in which distances d1, d2, and d4 to the sidewalls 20 and 21 are longer than the threshold and generates the corrected path 81. In the case illustrated in FIG. 8, since the trash box 30*b* and the other unknown object 31 are in the garage 18, the correction module 107 may also change the parking position 27 of the vehicle 1. Note that, in FIG. 8, the travel path 80, the start position 23, and the parking position 27 are not illustrated. In this case, the image generation module 108 generates the corrected path image 121*b* representing the corrected path 81 generated by the correction module 107. In the following explanation, the individual corrected path images 121*a* and 121*b* are simply referred to as corrected path images 121 unless particular distinguished.

As illustrated in FIG. 8, the display control module 109 causes the display device 120 to display the corrected path image 121*b*. As explained above, the display control module 109 causes the display device 120 to display the corrected path 81 generated according to the unknown object detected anew during the automatic travel, whereby the user can check the latest state of the corrected path 81. Note that the corrected path images 121 illustrated in FIG. 7 and FIG. 8 are examples. A display form is not limited thereto.

When the vehicle 1 is present at a position where the parking assistance is possible while the vehicle 1 is traveling, the display control module 109 notifies the driver by causing the display device 120 to display that the parking assistance is possible. The position where the parking assistance is possible is, for example, a position where a start position 23 of the travel path 80 or a point where the vehicle 1 can merge into the travel path 80 is present within a specified distance.

Referring back to FIG. 4, the audio output module 110 causes a speaker provided in the vehicle 1 to output sound or voice. For example, FIG. 7 and FIG. 8 illustrate an example in which the display control module 109 causes the display device 120 to display the message M1. However, a method of notifying the message M1 is not limited to the display. For example, the audio output module 110 may cause the speaker to output the message M1 as a voice message.

When the vehicle 1 is present at a position where the parking assistance is possible while the vehicle 1 is traveling, the audio output module 110 may notify the driver by causing the speaker to output a voice message indicating that the parking assistance is possible.

The travel control module 111 causes the vehicle 1 to automatically travel based on the travel path 80 recorded based on a parking operation in the past to cause the vehicle to enter or exit a garage. In the present embodiment, the travel path 80 recorded by the teacher traveling is an example of the travel path 80 recorded based on the parking operation in the past. The travel control module 111 moves the vehicle 1 to the parking space 19 with the automatic drive based on the travel path 80 or the corrected path 81 obtained by correcting the travel path 80. For example, the travel control module 111 controls steering, braking, and acceleration and deceleration of the vehicle 1 to thereby cause the vehicle 1 to automatically travel along the travel path 80 or the corrected path 81.

Note that, during the automatic travel by the travel control module 111, the driver may be seated on the driver's seat **130*a* of the vehicle 1 or may get off the vehicle 1. In the present embodiment, it is assumed that a driver is seated on the driver's seat 130*a* of the vehicle 1**.

Although FIG. 4 illustrates the parking assistance device 100 including the travel control module 111, the travel control module 111 may be implemented by another ECU different from the parking assistance device 100.

Next, a flow of correction processing of the travel path 80 executed by the parking assistance device 100 in the present embodiment configured as explained above is explained.

FIG. 9 is a flowchart illustrating an example of a flow of processing of the automatic travel and correction of the travel path 80 executed by the parking assistance device 100 according to the first embodiment. It is assumed that, at a point in time when the processing of this flowchart is executed, the travel path 80 based on the teacher traveling has been registered.

First, the acquisition module 102 acquires an absolute position, a peripheral image, a speed, a steering angle, a braking operation, and a distance measurement result of the vehicle 1 (S101). Although not illustrated in this flowchart, it is assumed that the acquisition of the absolute position, the peripheral image, the speed, the steering angle, the braking operation, and the distance measurement result of the vehicle 1 by the acquisition module 102 continues during the execution of this flowchart.

Then, the extraction module 103 extracts feature points from an acquired plurality of peripheral images (S102).

The estimation module 105 executes self-position estimation processing of estimating the position of the vehicle 1 by comparing the extracted feature points and feature points of a peripheral image captured by the in-vehicle camera 16 at the time of the teacher traveling (S103). The estimation module 105 may execute self-position estimation processing based on a distance measurement result acquired from the wave transmitter/receiver 15, GPS position information acquired from the GPS device 111, or the like.

The estimation module 105 determines, based on a result of the self-position estimation, whether the start position 23 of the travel path 80 or a point where the vehicle 1 can merge into the travel path 80 is present within a specified distance from the vehicle 1 (S104). When the start position 23 of the travel path 80 or a point where the vehicle 1 can merge into the travel path 80 is absent within the specified distance from the vehicle 1 (S104 "No"), the processing returns to S101. The specified distance is a distance that the travel control module 111 can cause the vehicle 1 to automatically travel and merge into the travel path 80. For example, if the current position of the vehicle 1 is too far from the start position 23, it is difficult for the travel control module 111 to execute the automatic travel based on the travel path 80. A specific value of the specified distance is not particularly limited. There is also a case in which the vehicle 1 can merge into the travel path 80 from a position other than the start position 23 of the travel path 80.

When the start position 23 of the travel path 80 or a point where the vehicle 1 can merge into the travel path 80 is present within the specified distance from the vehicle 1 (S104 "Yes"), the display control module 109 notifies the driver by causing the display device 120 to display that the parking assistance is possible (S105). Note that the audio output module 110 may notify the driver that parking assistance is possible by causing the speaker to output a voice message.

Then, the receiving module 101 determines whether parking assistance start operation by the user has been received (S106). When the parking assistance start operation by the user has not been received (S106 "No"), the receiving module 101 waits for the user's operation.

When the receiving module 101 receives the parking assistance start operation by the user (S106 "Yes"), the detection module 106 determines whether an obstacle has been detected around the vehicle 1 (S107). For example, the detection module 106 determines that an obstacle has been detected when detecting an object, the distance of which to the vehicle 1 is equal to or smaller than a threshold when the vehicle 1 travels based on the travel path 80 recorded by teacher traveling, among unknown objects absent at the time of the teacher traveling.

When the detection module 106 detects an obstacle (S107 "Yes"), the correction module 107 generates the corrected path 81 by correcting the travel path 80 such that the distance to the detected obstacle is equal to or greater than the threshold (S108).

The image generation module 108 generates the corrected path image 121 representing the corrected path 81 generated by the correction module 107 (S109).

The display control module 109 causes the display device 120 to display the corrected path image 121 generated by the image generation module 108 (S110).

Then, the travel control module 111 executes the automatic travel based on the corrected path 81 (S111).

When the detection module 106 detects an obstacle during the automatic travel (S112 "Yes"), the processing returns to S108. The correction module 107 further corrects the corrected path 81 such that the distance to the obstacle detected anew is equal to or greater than the threshold. Then, the processing in S109 to S111 is executed.

When the detection module 106 does not detect an obstacle during the automatic travel (S112 "No"), the travel control module 111 continues the automatic travel based on the corrected path 81 (S113).

While the vehicle 1 has not reached the parking space 19 (S114 "No"), the processing in S112 to S114 is repeated. When an obstacle is detected, the processing in S108 is executed.

Then, when the vehicle 1 has reached the parking space 19 (S114 "Yes"), the travel control module 111 causes the vehicle 1 to park in the parking space 19 (S115). Note that, when the vehicle 1 can park at the parking position 27 in the teacher traveling, the travel control module 111 causes the vehicle 1 to park at the parking position 27 in the parking space 19. As in the example illustrated in FIG. 8, when the vehicle 1 cannot park at the parking position 27 in the teacher traveling because of an obstacle, the travel control module 111 stops the vehicle 1 at a position where the distance between the obstacle and the vehicle 1 is equal to or greater than the threshold.

When the detection module 106 has not detected an obstacle (S107 "No"), the correction module 107 executes the automatic travel based on the travel path 80 recorded by the teacher traveling (S116). Subsequently to the processing in S116, the processing proceeds to S112 and, when the detection module 106 has detected an obstacle during the automatic travel, the processing proceeds to S108. When the detection module 106 has not detected an obstacle during the automatic travel, the processing proceeds to S113 to continue the automatic travel based on the travel path 80. Then, when the vehicle 1 has reached the parking space 19 in S114, the travel control module 111 proceeds to the processing in S115 and causes the vehicle 1 to park in the parking space 19. Here, the processing of this flowchart ends.

As explained above, the parking assistance device 100 in the present embodiment corrects the travel path 80 based on the detection result of the object during the automatic travel by the parking assistance based on the travel path 80 recorded based on the parking operation in the past and causes the display device 120 to display the corrected travel path 80, that is, the corrected path 81. This makes it possible to cause the user to grasp the corrected path 81. Therefore, with the parking assistance device 100 in the present embodiment, even when the vehicle 1 travels on a path different from the travel path 80 registered in advance, it is possible to reduce occurrence of an event that impairs the convenience of the user such as surprising the user because of an unexpected operation of the vehicle 1.

In the present embodiment, the parking operation in the past is a parking operation by manual drive of the driver of the vehicle 1. That is, in the parking assistance device 100 in the present embodiment, when the vehicle 1 during the automatic drive travels on a path different from the travel path 80 based on the teacher traveling by the driver who is the user, it is possible to reduce the driver's uneasiness or unrest by causing the driver to grasp that a path has been changed.

When a detected object is not an object detected at the time of recording the travel path 80, the parking assistance device 100 in the present embodiment corrects the travel path 80 such that the distance to the object is equal to or greater than the threshold. Therefore, with the parking assistance device 100 in the present embodiment, even when an unknown object is detected, it is possible to avoid contact between the object and the vehicle 1.

Note that, in the present embodiment, an example in which the vehicle 1 enters the garage 18 is explained. However, the parking assistance device 100 in the present embodiment can also be applied when the vehicle 1 leaves the garage 18.

Note that the parking assistance device 100 may discriminate an unknown object using an image recognition technology and, when the unknown object is identified as an object (for example, a puddle) having no influence on traveling, the parking assistance device 100 may notify the user by displaying the presence or absence of correction on display equipment and by voice and select the presence or absence of correction.

Modification 1 of First Embodiment

In the first embodiment explained above, the parking assistance device 100 causes the display device 120 in the vehicle 1 to display the corrected path image 121. In this modification 1, the parking assistance device 100 causes a display of a mobile terminal such as a smartphone to display the corrected path image 121.

The parking assistance device 100 in the present modification has the same hardware configuration as the hardware configuration in the first embodiment. As in the first embodiment, the parking assistance device 100 in the present modification includes the receiving module 101, the acquisition module 102, the extraction module 103, the path recording module 104, the estimation module 105, the detection module 106, the correction module 107, the image generation module 108, the display control module 109, the audio output module 110, the travel control module 111, and a storage unit 150.

The receiving module 101, the acquisition module 102, the extraction module 103, the path recording module 104, the estimation module 105, the detection module 106, the correction module 107, the image generation module 108, the audio output module 110, the travel control module 111, and the storage unit 150 have the same functions as the functions in the first embodiment.

The display control module 109 in the present modification causes a display of a mobile terminal such as a smartphone to display the travel path 80 corrected by the correction module 107, that is, the corrected path 81 at least before the start of the automatic travel by the parking assistance or during the automatic travel. For example, the display control module 109 causes the display of the mobile terminal such as the smartphone to display the corrected path image 121 generated by the image generation module 108.

For example, the display control module 109 transmits the corrected path image 121 to the mobile terminal such as the smartphone via the NW I/F 11F and causes the display to display the corrected path image 121.

The display of the mobile terminal such as the smartphone is an example of the display unit in the present embodiment. When the display of the mobile terminal such as the smartphone has a function as a touch panel, the touch panel is an example of the operation unit.

Figure 10:
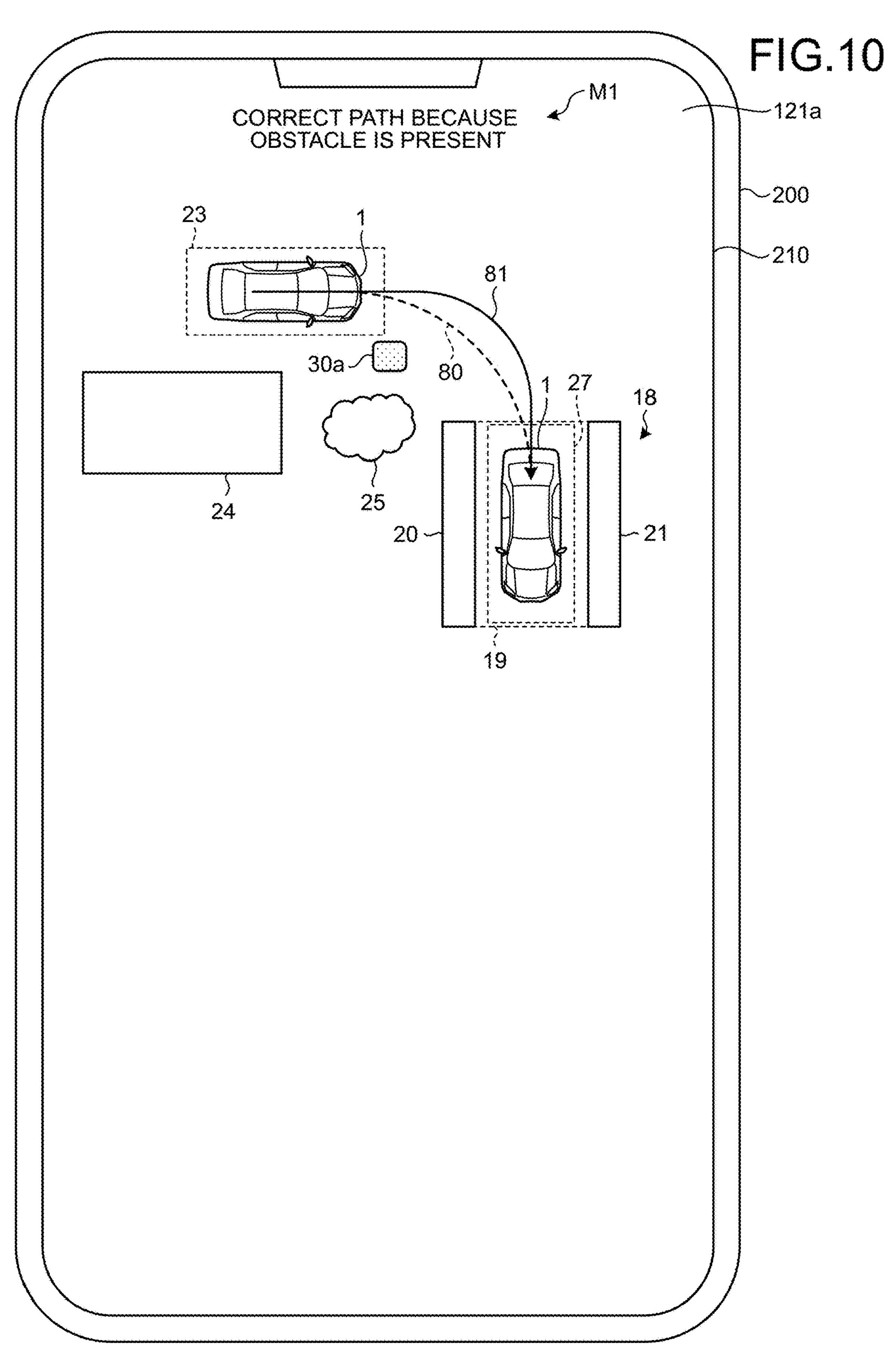
FIG. 10 is a diagram illustrating an example of a corrected path image displayed on a display of a smartphone according to a modification 1 of the first embodiment.

FIG. 10 is a diagram illustrating an example of the corrected path image 121*a* displayed on a display 210 of a smartphone 200 according the modification 1 of the first embodiment. Display content of the corrected path image 121*a* is the same as the display content in the first embodiment explained with reference to FIG. 7. The smartphone 200 may be a smartphone of the driver of the vehicle 1 or a smartphone of a passenger other than the driver.

For example, when the driver of the vehicle 1 executes entry of the vehicle 1 by the automatic travel in a state in which the driver has got off the vehicle 1, the driver can check, by viewing the corrected path image 121*a* displayed on the display 210 of the smartphone 200, a path on which the vehicle 1 travels. Therefore, according to the present modification, even when the vehicle 1 travels along the corrected path 81 rather than the travel path 80 registered in advance, the driver can grasp the corrected path 81 with the smartphone 200.

When the driver of the vehicle 1 executes exit of the vehicle 1 in a state in which the drive has got off the vehicle 1, the driver and a passenger of the vehicle 1 can grasp, by viewing the corrected path image 121*a* displayed on the display 210 of the smartphone 200, a position where the vehicle 1 leaves the garage 18 and stops and a path on which the vehicle 1 travels until stopping. In particular, when the stop position of the vehicle 1 is different from a stop position of the travel path 80 registered in advance because of an obstacle in exiting, the driver and the passenger can wait for the vehicle 1 at an appropriate position by grasping a corrected stop position with the corrected path image 121*a*.

Modification 2 of First Embodiment

In the first embodiment explained above, the travel control module 111 of the parking assistance device 100 causes the vehicle 1 to automatically travel based on the travel path 80 based on the teacher traveling by the driver to cause the vehicle 1 to enter or exit the garage. However, a recording method of the travel path 80 is not limited to the teacher traveling. For example, the travel path 80 may be recorded based on a parking operation by the automatic drive of the vehicle 1.

More specifically, the parking assistance device 100 may include a parking path generation module that generates a parking path for a target parking position in addition to the functional units illustrated in FIG. 4. In this case, the parking path generation module generates the travel path 80 with processing such as an arithmetic operation. Then, the parking path generation module stores the generated travel path 80 in the storage unit 150. Note that the parking path generation module may generate a plurality of travel paths 80 and the user may select a registration target travel path 80 from the plurality of travel paths 80.

Second Embodiment

In the first embodiment explained above, a case in which the travel path 80 registered in advance is one type is explained. However, a plurality of travel paths 80 may be registered. In the present embodiment, the parking assistance device 100 specifies, among the plurality of travel paths 80 registered in advance, based on at least one of environmental information concerning environment around the vehicle 1 and user information concerning the user who gets in the vehicle 1, the travel path 80 on which the vehicle 1 travels.

The parking assistance device 100 in the present modification has the same hardware configuration as the hardware configuration in the first embodiment.

Figure 11:
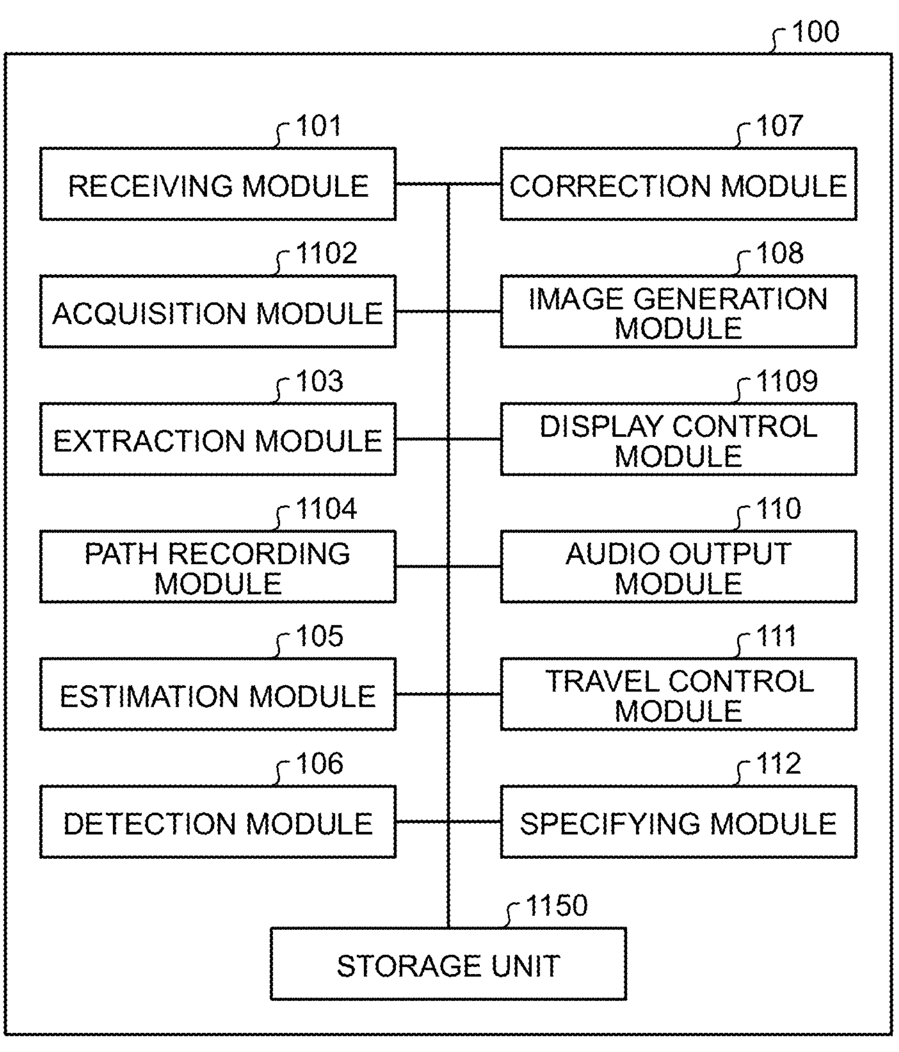
FIG. 11 is a block diagram illustrating an example of functions included in a parking assistance device according to a second embodiment.

FIG. 11 is a block diagram illustrating an example of functions included in the parking assistance device according to the second embodiment. As illustrated in FIG. 4, the parking assistance device 100 in the present embodiment includes the receiving module 101, an acquisition module 1102, the extraction module 103, a path recording module 1104, the estimation module 105, the detection module 106, the correction module 107, the image generation module 108, a display control module 1109, the audio output module 110, the travel control module 111, a specifying module 112, and a storage unit 1150.

The receiving module 101, the extraction module 103, the estimation module 105, the detection module 106, the correction module 107, the image generation module 108, and the audio output module 110 have the same functions as the functions in the first embodiment.

As in the first embodiment, the storage unit 1150 in the present embodiment is configured by, for example, the ROM 11B, the RAM 11C, or the HDD 11G. In addition to the same contents as the contents in the first embodiment, the storage unit 1150 in the present embodiment stores the plurality of travel paths 80 in association with at least one of environmental information and user information.

In the first embodiment, the presence or absence of an obstacle detected by the wave transmitter/receiver 15, the distance between the obstacle around the vehicle 1 and the vehicle 1 measured by the wave transmitter/receiver 15, and the peripheral image are cited as the examples of the environmental information concerning the environment around the vehicle 1. However, the environmental information is not limited thereto. For example, the environmental information may include feature points around the vehicle 1 extracted from a detection result of the wave transmitter/receiver 15 or a peripheral image, a position coordinate of the vehicle 1, and weather around the vehicle 1 or the parking space 19.

The user information is information concerning a driver or a passenger of the vehicle 1, and is, for example, age, physical information, and the like of the driver or the passenger. The physical information is, for example, the presence or absence of use of a wheelchair, the presence or absence of other physical handicaps, and the like. Note that the user information is not limited thereto. When the driver and the passenger are collectively referred to, the driver and the passenger are simply referred to as user. The age and the physical information of the driver or the passenger are also referred to as attribute information of the user. The attribute information of the user is not limited to the above example but includes at least information concerning any one of the age of the user and a physical handicap of the user.

More specifically, the storage unit 1150 in the present embodiment stores a travel path database in which a plurality of travel paths 80 are associated with at least one of conditions concerning the environmental information and conditions concerning the user information.

FIG. 12 is a diagram illustrating an example of a travel path database 90 according to the second embodiment. In the example illustrated in FIG. 12, the travel path database 90 is a database in which travel path numbers of the plurality of travel paths 80, the conditions concerning the environmental information, and the conditions concerning the user information are associated with one another.

The travel path numbers are an example of identification information that can specify the travel paths 80. The conditions concerning the environmental information are condition that specify environmental information corresponding to the travel paths 80. The conditions concerning the user information are conditions that specify user information corresponding to the travel paths 80. In the example illustrated in FIG. 12, the travel path 80 having a travel path number "1" is associated with conditions concerning the environmental information "a peripheral feature point: xxx, presence or absence of an obstacle: none, and weather: sunny or cloudy". That is, when environment around the vehicle 1 or the parking space 19 coincides the conditions, the travel path 80 having the travel path number "1" is recommended. Note that a plurality of conditions registered as the conditions concerning the environmental information in FIG. 12 may be AND conditions or may be OR conditions.

In addition, in the example illustrated in FIG. 12, the travel path 80 having the travel path number "1" is associated with a condition concerning user information "healthy person, age: teens to sixties". In addition, the travel path 80 having a travel path number "2" is associated with conditions concerning the user information "wheelchair user, age: seventies or older". A plurality of conditions registered as the conditions concerning the user information in FIG. 12 may be AND conditions or may be OR conditions.

For example, when the user is a wheelchair user, the travel path 80 in which the vehicle 1 exits the parking space 19 and thereafter stops near a slope of the building 24 is highly convenient for the user. When the weather is rainy, the travel path 80 in which the vehicle 1 exits the parking space 19 and thereafter stops near the entrance of the building 24 is highly convenient for the user. When the user is a healthy person who has no particular inconvenience in walking, the travel path 80 in which the vehicle 1 parks at a position where it is easy for the driver to start the vehicle 1 after the getting on the vehicle 1 is highly convenient for the user.

Note that only one of the conditions concerning the environmental information and the conditions concerning the user information may be registered in the travel path database 90.

The storage unit 1150 in the present embodiment stores a user information database 91 in which a user ID, body information of a user specified by the user ID, and age are associated with one another.

FIG. 13 is a diagram illustrating an example of the user information database 91 according to the second embodiment.

Note that, in FIG. 12 and FIG. 13, the travel path database 90 and the user information database 91 are illustrated in a table format. However, a data format is not limited if target information is associated. Whether users are a driver or a passenger of the vehicle 1 may be further registered in the user information database 91.

Referring back to FIG. 11, the path recording module 1104 in the present embodiment records the travel path 80 of the vehicle 1 in the teacher traveling by the driver in association with at least one of the environmental information and the user information. The travel path database 90 is generated by the recording processing. Note that the travel path database 90 may be generated by an information processing device or the like outside the vehicle 1 or may be registered by the user from a touch panel of the display device 120 or a mobile terminal such as the smartphone 200.

The acquisition module 1102 in the present embodiment has the same function as the function in the first embodiment and acquires at least one of environmental information concerning environment around the vehicle 1 and user information concerning a user who gets in the vehicle 1.

For example, the acquisition module 1102 acquires the presence or absence of an obstacle detected by the wave transmitter/receiver 15, the distance between an obstacle around the vehicle 1 and the vehicle 1 measured by the wave transmitter/receiver 15, a peripheral image captured by the in-vehicle camera 16, and GPS position information of the vehicle 1 measured by the GPS device 111. The acquisition module 1102 may acquire information concerning weather from the information processing device outside the vehicle 1 via a network. Alternatively, the acquisition module 1102 may acquire weather around the vehicle 1 from a peripheral image captured by the in-vehicle camera 16.

The specifying module 112 specifies the travel path 80 corresponding to at least one of the acquired environmental information and the acquired user information among the plurality of travel paths 80 registered in advance in the storage unit 1150. In the present embodiment, both of the environmental information and the user information are set as conditions for specifying the travel path 80. For example, when the acquired environmental information satisfies conditions "peripheral feature point: xxx, presence or absence of obstacle: absent, weather: sunny or cloudy" and the acquired user information satisfies conditions "healthy person, age: teens to sixties", the specifying module 112 specifies the travel path 80 having the travel path number "1" exemplified in FIG. 12 as the travel path 80 used for the automatic travel of the vehicle 1.

When a plurality of travel paths 80 corresponding to at least one of the acquired environmental information and the acquired user information among the plurality of travel paths 80 registered in advance in the storage unit 1150 are present, the specifying module 112 specifies the plurality of travel paths 80 corresponding to at least one of the acquired environmental information and the acquired user information as candidates of the travel path 80 used for automatic travel of the vehicle 1.

When the plurality of travel paths 80 are specified as candidates, the specifying module 112 may calculate, according to at least one of the environmental information and the user information, a degree of recommendation of the travel paths 80 specified as the candidates. Alternatively, the specifying module 112 may calculate the degree of recommendation of the travel paths 80 according to a frequency of the travel paths 80 specified as the candidates having been selected by the user in the past.

The display control module 1109 in the present embodiment has the same function as the function in the first embodiment and the modification 1 of the first embodiment and causes the display 210 of the smartphone 200 to display the travel path 80 or the candidates of the travel path 80 specified by the specifying module 112. The display 210 of the smartphone 200 is an example of the display unit in the present embodiment.

Figure 14:
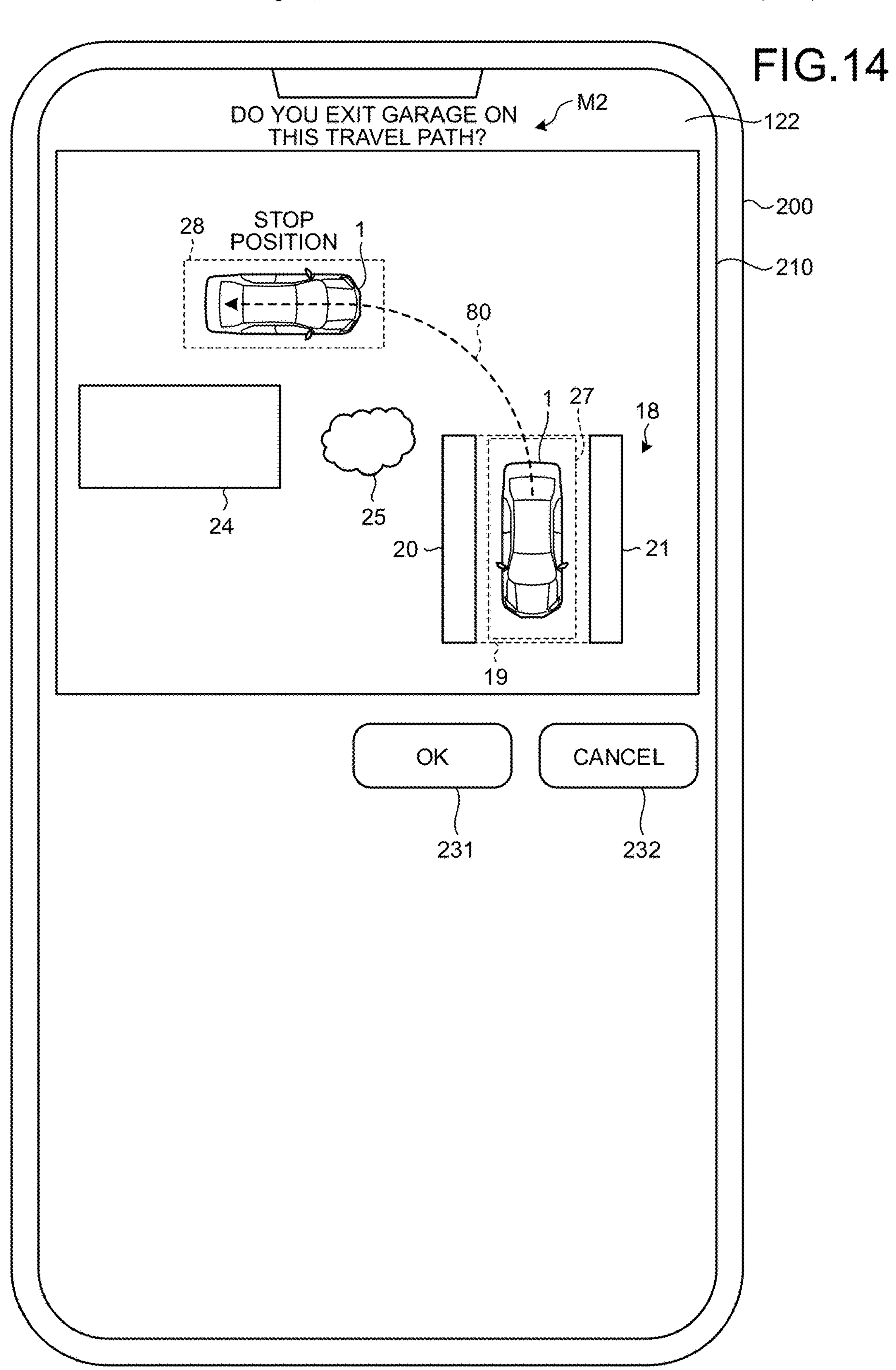
FIG. 14 is a diagram illustrating an example of a travel path notification screen displayed on a display of a smartphone according to the second embodiment.

FIG. 14 is a diagram illustrating an example of a travel path notification screen 122 displayed on the display 210 of the smartphone 200 according to the second embodiment. The travel path notification screen 122 is, for example, a screen on which an image representing the travel path 80 specified by the specifying module 112 is displayed. In the example illustrated in FIG. 14, the travel path notification screen 122 represents the travel path 80 from exit of the vehicle 1 from the parking space 19 in the garage 18 to a stop at a stop position 28. The travel path notification screen 122 may also illustrate objects such as the parking space 19 and the building 24 around the stop position 28.

In the example illustrated in FIG. 14, a message M2 "Do you exit the garage on this travel path?" is displayed on the travel path notification screen 122. Without being limited to the content, the display control module 1109 may cause the display 210 to display the message M2 for urging the user to approve the travel path 80.

In the example illustrated in FIG. 14, an OK button 231 and a cancel button 232 are displayed on the travel path notification screen 122. The OK button 231 is an image button that capable of receiving operation of the user for approving to cause the vehicle 1 to automatically travel along the travel path 80 displayed on the travel path notification screen 122. The cancel button 232 is an image button capable of receiving operation of the user for cancelling the automatic travel along the travel path 80 displayed on the travel path notification screen 122. When the OK button 231 or the cancel button 232 is operated by the user, the receiving module 101 receives the operation of the user.

When the cancel button 232 is pressed by the user, for example, the display control module 1109 may cause the display 210 to display a list of the travel paths 80 registered in advance and cause the user to select the travel path 80. Alternatively, when the cancel button 232 is pressed by the user, the parking assistance device 100 may cancel the automatic travel of the vehicle 1 and wait for manual travel by the driver.

As explained above, the plurality of travel paths 80 corresponding to at least one of the acquired environmental information and the acquired user information among the plurality of travel paths 80 registered in advance in the storage unit 1150 are sometimes present. When the plurality of travel paths 80 are specified by the specifying module 112, the display control module 1109 causes the display 210 of the smartphone 200 to display the specified plurality of travel paths 80. For example, the display control module 1109 causes the display 210 of the smartphone 200 to display a travel path selection screen that displays a specified plurality of travel paths as a plurality of travel path candidates to enable the user to select a travel path.

Figure 15:
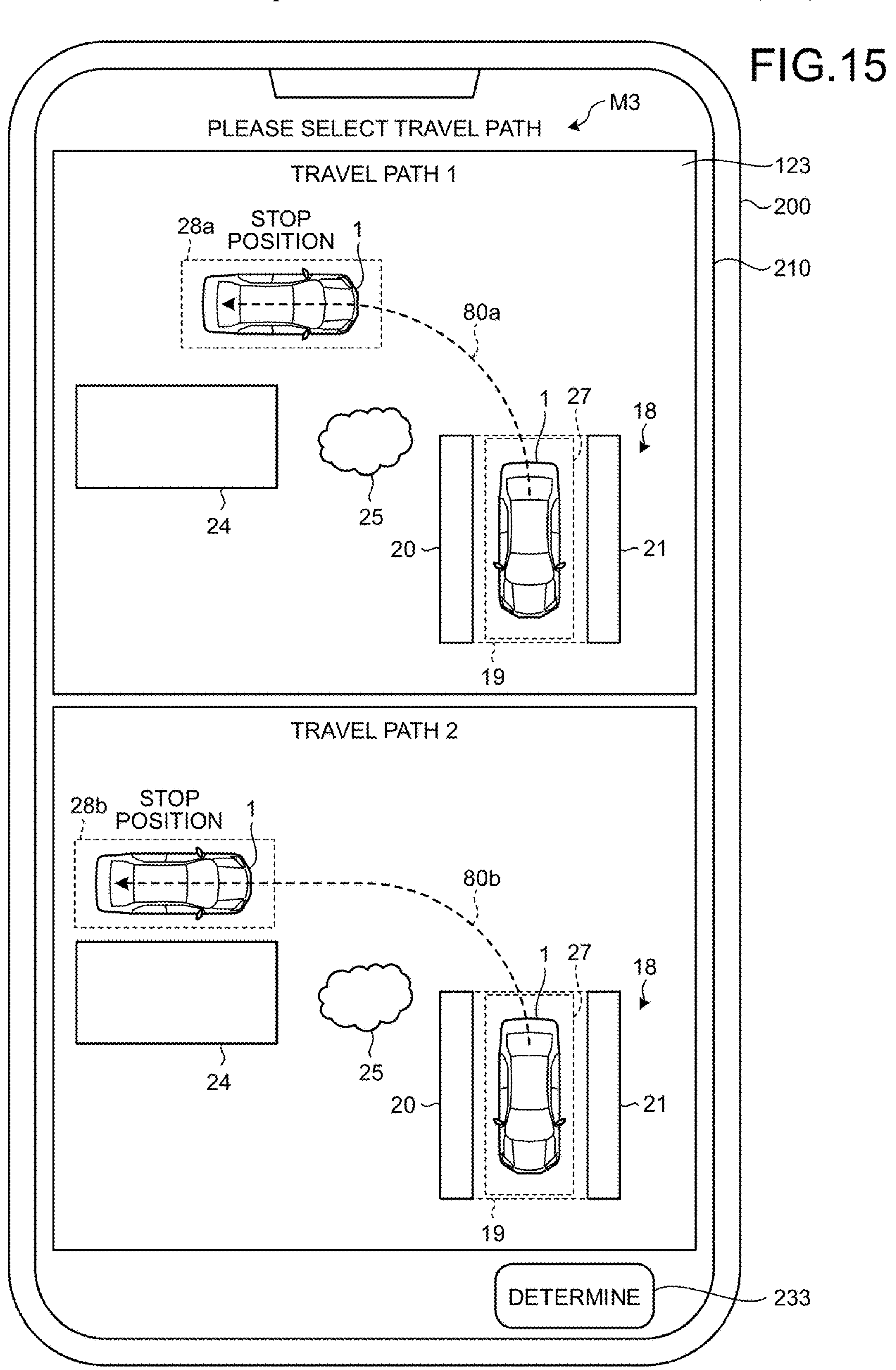
FIG. 15 is a diagram illustrating an example of a travel path selection screen displayed on the display of the smartphone according to the second embodiment.

FIG. 15 is a diagram illustrating an example of a travel path selection screen 123 displayed on the display 210 of the smartphone 200 according to the second embodiment. As illustrated in FIG. 15, the travel path selection screen 123 is an image representing a plurality of travel paths 80*a* and 80*b*. In the example illustrated in FIG. 15, the travel paths 80*a* and 80*b* respectively stop at different stop positions 28*a* and 28*b*. In the following explanation, the travel paths 80*a* and 80*b* are simply referred to as travel path 80 unless particularly distinguished. The stop positions 28*a* and 28*b* are simply referred to as stop position 28 unless specifically distinguished.

In the example illustrated in FIG. 15, a message M3 "Please select a travel path" is displayed on the travel path selection screen 123. Without being limited to the content, the display control module 1109 may display the message M2 for urging the user to select the travel path 80. Note that the messages M2 and M3 may be output as voice messages by the audio output module 110.

In the example illustrated in FIG. 15, a determination button 233 is displayed on the travel path selection screen 123. The determination button 233 is an image button capable of receiving operation of the user for selecting one of the travel paths 80*a* and 80*b* displayed on the travel path selection screen 123. For example, after pressing one of an image indicating the travel path 80*a* and an image indicating the travel path 80*b* on the display 210, the user presses the determination button 233 to select the pressed travel path 80 out of the travel paths 80*a* and 80*b*. When the determination button 233 is operated by the user, the receiving module 101 receives the operation of the user.

When any one of the travel paths 80*a* and 80*b* is selected by the user, the display control module 1109 may display the travel path notification screen 122 for the user to confirm the selected travel path 80 again. Alternatively, when any one of the travel paths 80*a* and 80*b* is selected by the user, the automatic travel by the travel control module 111 may be started.

When the plurality of travel paths 80 are presented as candidates as illustrated in FIG. 15, the display control module 1109 may arrange the travel paths 80 on the travel path selection screen 123 in descending order of degrees of recommendation of the travel paths 80 calculated by the specifying module 112.

When the user has selected any one of the travel paths 80, the receiving module 101 causes the storage unit 1150 to store the travel path 80 selected by the user in association with a user ID of the user. Information in which the travel path 80 selected by the user and the user ID of the user are associated with each other is an example of a use history in the past of the user of the vehicle 1. When the plurality of travel paths 80 are specified by the specifying module 112 for the second and subsequent times, the display control module 1109 causes the display 210 of the smartphone 200 to display the specified plurality of travel paths in order based on the use history in the past of the user of the vehicle 1. For example, the display control module 1109 causes the display 210 to display the plurality of travel paths 80 such that the travel path 80 having a higher frequency of being selected by the user in the past is displayed in higher order. Such display enables the user to easily find a desired travel path 80 even when a plurality of travel path candidates are present.

Note that the display control module 1109 may display the travel path notification screen 122 and the travel path selection screen 123 only when the user of the smartphone 200 is not a passenger but is a driver of the vehicle 1. Alternatively, when the user of the smartphone 200 is a passenger of the vehicle 1, the display control module 1109 may display only the travel path notification screen 122. In this case, the OK button 231 and the cancel button 232 are not displayed on the travel path notification screen 122 displayed on the smartphone 200 of the passenger.

Referring back to FIG. 11, the travel control module 111 in the present embodiment has the same function as the function in the first embodiment and causes the vehicle 1 to travel to the stop position 28 corresponding to the travel path 80 based on the travel path 80 specified by the specifying module 112. When a plurality of travel paths 80 corresponding to at least one of the acquired environmental information and the acquired user information are present, the travel control module 111 causes the vehicle 1 to travel to the stop position 28 corresponding to the travel path 80 based on the travel path 80 selected by the user among the specified plurality of travel paths 80.

Figure 16:
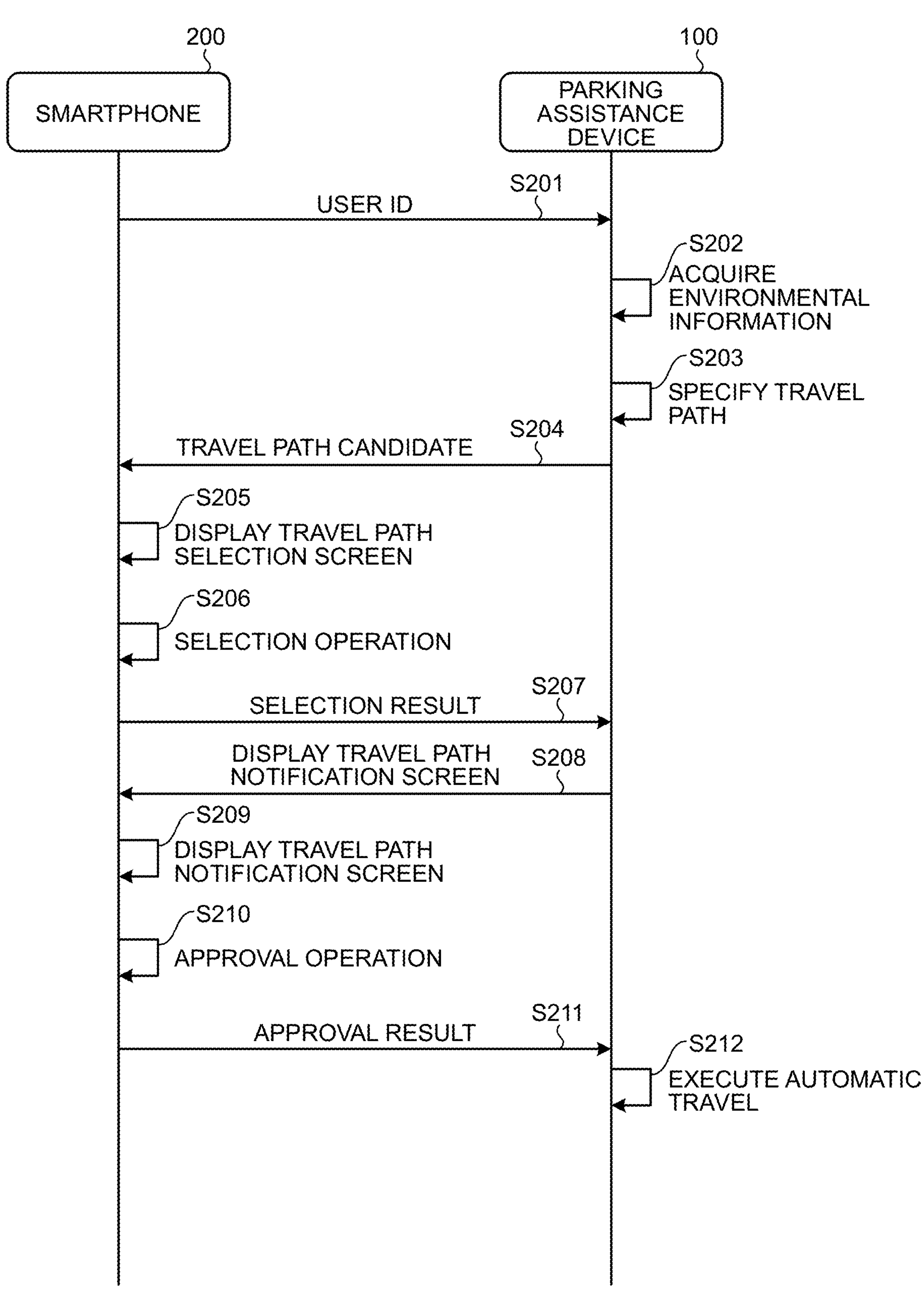
FIG. 16 is a sequence chart illustrating an example of a flow of processing executed by the parking assistance device and the smartphone according to the second embodiment.

FIG. 16 is a sequence chart illustrating an example of a flow of processing executed by the parking assistance device 100 and the smartphone 200 according to the second embodiment.

First, the smartphone 200 transmits, to the parking assistance device 100, a user ID owned by the user of the smartphone 200 to use the vehicle 1 (S201).

Note that, in this sequence chart, the acquisition module 1102 of the parking assistance device 100 acquires the user ID from the smartphone 200. However, the acquisition module 1102 may acquire user information such as the age and physical information of the user of the smartphone 200. In this case, for example, the acquisition module 1102 may acquire user information concerning all users including the driver and the passenger from the smartphone 200 of the driver of the vehicle 1 or may separately acquire the user information of the users from smartphones 200 of the users When acquiring the user ID from the smartphone 200 as in S201, the acquisition module 1102 may acquire user IDs of all the users including the driver and the passenger from the smartphone 200 of the driver of the vehicle 1 or may separately acquire the user IDs of the users from the smartphones 200 of the users.

The acquisition module 1102 of the parking assistance device 100 acquires environmental information concerning environment around the vehicle 1 (S202).

Then, the specifying module 112 of the parking assistance device 100 acquires physical information and the age of the user corresponding to the acquired user ID from the user information database 91 and specifies, based on the acquired physical information and the acquired age of the user and the environmental information acquired by the acquisition module 1102, the travel path 80 satisfying conditions from the plurality of travel paths 80 registered in advance in the storage unit 1150 (S203). Here, it is assumed that a plurality of travel paths 80 corresponding to the acquired environmental information and the acquired user information among the plurality of travel paths 80 registered in advance in the storage unit 1150 are present.

The display control module 1109 of the parking assistance device 100 transmits the plurality of travel paths 80 specified by the specifying module 112 to the smartphone 200 via the network and causes the display 210 to display the plurality of travel paths (S204).

The smartphone 200 causes the display 210 to display the travel path selection screen 123 selectively representing the plurality of travel paths 80 transmitted from the parking assistance device 100 (S205).

Then, when the user presses one of the image indicating the travel path 80*a* and the image indicating the travel path 80*b* on the display 210 of the smartphone 200 and thereafter performs selection operation of pressing the determination button 233 (S206), the smartphone 200 notifies the travel path 80 selected by the user to the parking assistance device 100 (S207). The receiving module 101 of the parking assistance device 100 receives selection operation for the travel path 80 by the user via the smartphone 200.

The display control module 1109 of the parking assistance device 100 transmits a display instruction for the travel path notification screen 122 representing the travel path 80 selected by the user to the smartphone 200 to thereby cause the smartphone 200 to display the travel path notification screen 122 (S208).

The smartphone 200 causes the display 210 to display the travel path notification screen 122 (S209).

When the user performs approval operation of pressing the OK button 231 on the display 210 of the smartphone 200 (S210), the smartphone 200 notifies the parking assistance device 100 that a start of the automatic travel based on the travel path 80 has been approved by the user (S211).

Then, the travel control module 111 of the parking assistance device 100 executes the automatic travel based on the travel path 80 selected and approved by the user (S212). Note that the parking assistance device 100 executes correction processing for the travel path 80 corresponding to a detection result of an obstacle as in the first embodiment before the start of the automatic travel of the vehicle 1 and during the automatic travel. When correcting the travel path 80, the parking assistance device 100 causes the display 210 of the smartphone 200 to display the corrected path 81 as in the modification 1 of the first embodiment. Here, the processing of this sequence chart ends.

When the obstacle has been detected based on the environmental information acquired in S202, the correction module 107 may correct the travel path 80 specified by the specifying module 112 and then the processing in and after S204 may be executed.

As explained above, the parking assistance device 100 in the present embodiment causes the display 210 of the smartphone 200 to display the travel path 80 corresponding to at least one of the environmental information and the user information among the plurality of travel paths 80 registered in advance. Therefore, with the parking assistance device 100 in the present embodiment, in addition to the effects of the first embodiment, it is possible to improve convenience for the user by proposing the travel path 80 according to the environmental information or the user information to the user.

For example, the parking assistance device 100 in the present embodiment specifies, based on information concerning any one of the age of the user and the physical handicap of the user, the travel path 80 suitable for the user among the plurality of travel paths 80 registered in advance. Therefore, with the parking assistance device 100 in the present embodiment, even in a use form in which one vehicle 1 is shared by a plurality of users, it is possible to propose the travel paths 80 corresponding to states of the individual users.

Note that, in the present embodiment, a case in which the vehicle 1 exits the parking space 19 is exemplified. However, the configuration in the present embodiment can also be applied to a case in which the vehicle 1 enters the parking space 19.

Modification 1 of Second Embodiment

In the second embodiment explained above, the user information is the age, the physical information, or the like of the driver or the passenger. However, the user information is not limited thereto. For example, the user information may be information concerning a driver and a passenger registered in a use schedule of the vehicle 1.

For example, there is a use form in which a plurality of users share one vehicle 1. In the case of such a use form, for example, the use schedule of the vehicle 1 is registered in a cloud server 300 or the like provided in a cloud environment. The use schedule includes a user ID and the like of a user who uses the vehicle 1 for each time.

Figure 17:
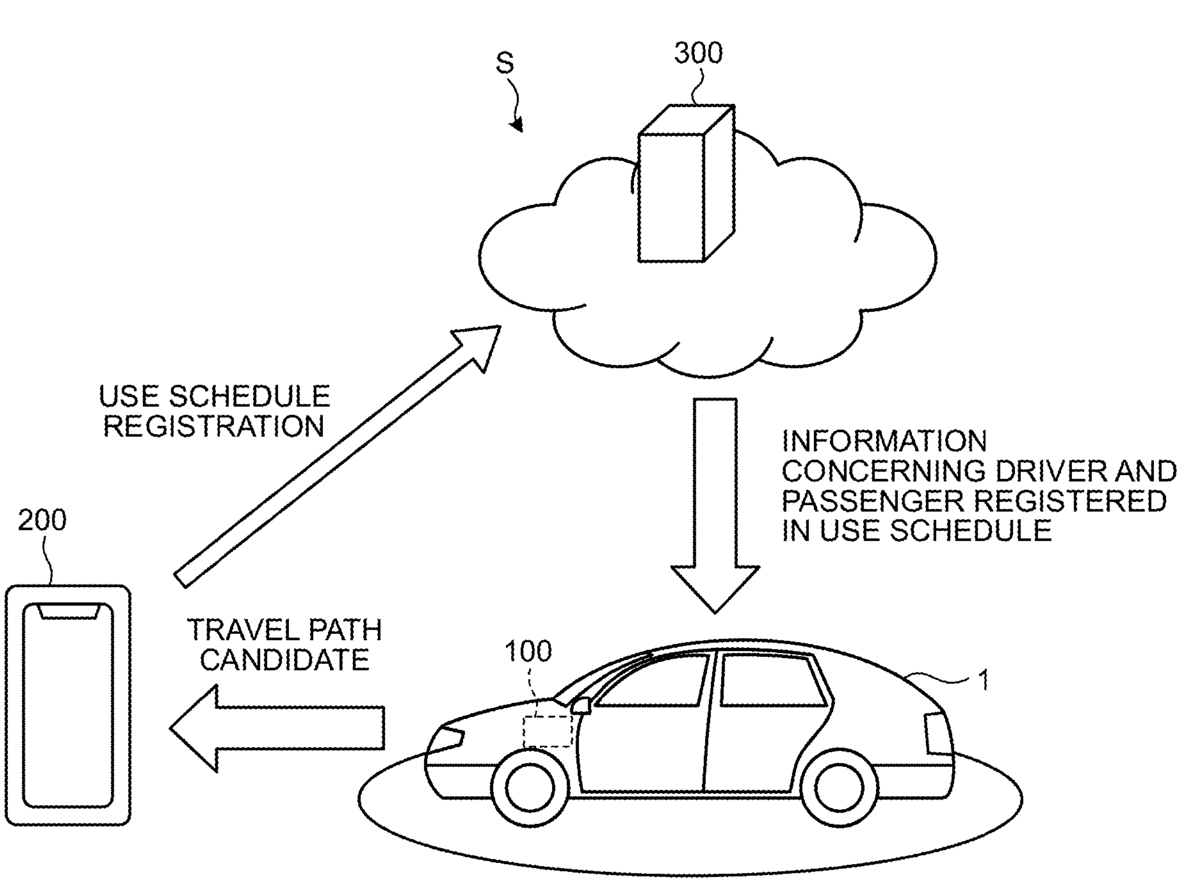
FIG. 17 is a diagram illustrating an example of a configuration of a management system for a use schedule of a vehicle according to a modification 1 of the second embodiment.

FIG. 17 is a diagram illustrating an example of a configuration of a management system S for a use schedule of the vehicle 1 according to a modification 1 of the second embodiment. The management system S includes, for example, a cloud server 300, a terminal device such as the smartphone 200 or a personal computer (PC), and the parking assistance device 100 mounted on the vehicle 1. Note that, instead of the cloud server 300, a normal server device, a PC, or the like may be used.

As illustrated in FIG. 17, a user registers a use schedule in the smartphone 200. Then, the smartphone 200 transmits the use schedule registered by the user to the cloud server 300. The use schedule is stored in the cloud server 300. Then, the acquisition module 1102 of the parking assistance device 100 acquires, from the cloud server 300, information concerning a driver and a passenger registered in the use schedule of the vehicle 1.

Note that the smartphone 200 and the parking assistance device 100 of the vehicle 1 may not be directly connected and may transmit and receive data and control signals via the cloud server 300, another server device, or the like.

As explained in the second embodiment, the parking assistance device 100 transmits a specified travel path candidate to the smartphone 200 and causes the display 210 to display the travel path selection screen 123 and the travel path notification screen 122.

FIG. 18 is a diagram illustrating an example of a use schedule database 92 stored in the cloud server 300 according to the modification 1 of the second embodiment. The use schedule database 92 is, for example, a database in which a vehicle ID capable of specifying a reservation target vehicle 1, a reservation time, and a user ID are registered in association with one another. Note that, in FIG. 18, a case in which reservations of a plurality of vehicles 1 are registered is illustrated as an example, and a vehicle ID is included in the use schedule database 92. However, when there is only one vehicle 1 as a schedule registration target, the vehicle ID may not be included in items of the use schedule database 92.

The specifying module 112 of the parking assistance device 100 in the present modification acquires physical information and the age of a user corresponding to a user ID registered in the use schedule database 92 from the user information database 91 and specifies, based on the acquired physical information and the acquired age of the user and environmental information acquired by the acquisition module 1102, the travel path 80 satisfying the conditions from the plurality of travel paths 80 registered in advance in the storage unit 1150.

With such a configuration, the parking assistance device 100 in the present modification can propose the travel path 80 suitable for the user only by the user reserving the vehicle 1. Therefore, with the parking assistance device 100 in the present modification, it is possible to simplify operation of the user and improve convenience of the user.

Modification 2 of Second Embodiment

The user information may be the user ID itself. For example, in the second embodiment, the travel path database 90 is the database in which the travel path numbers of the plurality of travel paths 80, the conditions concerning the environmental information, and the conditions concerning the user information are associated with one another. However, the travel path database 90 may be a database in which the plurality of travel paths 80 and user IDs are associated with each other.

FIG. 19 is a diagram illustrating an example of a travel path database 1090 according to a modification 2 of the second embodiment. As illustrated in FIG. 19, the travel path database 1090 of the present modification is a database in which the travel path numbers of the plurality of travel paths 80 and user IDs are associated with each other.

The specifying module 112 of the parking assistance device 100 of the present modification retrieves, from the travel path database 1090, a travel path number corresponding to a user ID of the vehicle 1 acquired by the acquisition module 1102 and specifies the travel path 80 corresponding to the travel path number as the travel path 80 corresponding to user information.

Modification 3 of Second Embodiment

In the second embodiment, it is assumed that the plurality of travel paths 80 are stored in the storage unit 1150 of the parking assistance device 100. However, a storage place is not limited thereto. For example, the plurality of travel paths 80 may be stored in a storage device such as the cloud server 300 provided outside the vehicle 1.

The acquisition module 1102 of the present modification acquires the plurality of travel paths 80 from the storage device provided outside vehicle 1 together with at least one of environmental information and user information corresponding to each of the plurality of travel paths 80. For example, the acquisition module 1102 acquires, in a state in which the travel path numbers of the plurality of travel paths 80, the conditions concerning the environmental information, and the conditions concerning the user information are associated with one another, these kinds of information from the storage device such as the cloud server 300.

Then, the specifying module 112 in the present modification specifies the travel path 80 corresponding to at least one of current environmental information and current user information among the plurality of travel paths 80 stored in the storage device such as the cloud server 300.

Modification 4 of Second Embodiment

The acquisition module 1102 may acquire both of the travel path 80 stored in a storage device such as the cloud server 300 provided outside the vehicle 1 and the travel path 80 stored in the storage unit 1150 of the parking assistance device 100.

In this case, the specifying module 112 in the present modification specifies the travel path 80 and a parking position corresponding to at least one of current environmental information and current user information among the plurality of travel paths 80 stored in the storage unit 1150 and the external storage device.

The plurality of travel paths 80 may be stored in a storage device in the vehicle 1 provided separately from the parking assistance device 100.

Modification 5 of Second Embodiment

In the second embodiment explained above, the parking assistance device 100 is explained as displaying the corrected path 81 on the display 210 of the smartphone 200 as in the first embodiment or the modification 1 of the first embodiment. However, the parking assistance device 100 in the second embodiment may not have the function of displaying the corrected path 81. That is, a specific function of the travel path 80 corresponding to the environmental information or the user information in the second embodiment may be independently applied to the parking assistance device of the related art.

Modification 6 of Second Embodiment

In the second embodiment explained above, the display 210 of the smartphone 200 is an example of the display unit. However, the display device 120 may be an example of the display unit as in the first embodiment. For example, the display control module 1109 of the parking assistance device 100 may cause the display device 120 to display the travel path notification screen 122 and the travel path selection screen 123 in the case of a state in which the driver has got on the vehicle 1 and may cause the display 210 of the smartphone 200 to display the travel path notification screen 122 and the travel path selection screen 123 in the case of a state in which the driver has got off the vehicle 1.

Modifications of First Embodiment and Second Embodiment

In the first and second embodiments explained above, the display device 120 included in the vehicle 1 or the display 210 of the mobile terminal such as the smartphone 200 is an example of the display unit. However, the display device 120 is not limited thereto. For example, a head-up display projected on the windshield 180 of the vehicle 1 or a transparent plate near the windshield 180 may be used as the display unit.

An operation terminal capable of transmitting a signal from the outside of the vehicle 1 to the vehicle 1, such as a remote controller or an electronic key, may be an example of the operation unit.

A part of the functions of the parking assistance device 100 in the first and second embodiments explained above may be executed by an information processing device provided outside the vehicle 1. The information processing device provided outside the vehicle 1 is, for example, a mobile terminal such as the smartphone 200, a PC, the cloud server 300, another server device, or the like.

With the parking assistance device and the parking assistance method according to the present disclosure, it is possible to reduce impairment of a user's convenience even when a vehicle travels on a path different from a pre-registered travel path.

Although several embodiments of the present invention have been described, these embodiments have been presented by way of example only, and are not intended to limit the scope of the invention. These embodiments may be embodied in a variety of other forms; furthermore, various omissions, substitutions, and changes may be made without departing from the spirit of the invention. These embodiments and the modifications thereof are included in the scope and spirit of the inventions, and are included in the inventions described in the claims and the scope of equivalents of the inventions.

What is claimed is:

1. A parking assistance device that causes a vehicle to automatically travel based on a travel path in a parking operation in a past by a driver, the parking assistance device comprising:

a memory; and a processor coupled to the memory and configured to:

register, by a user using a touch panel of a display, a travel path database;

acquire first feature points around the vehicle in the parking operation in the past by the driver;

cause the memory to store, in the travel path database, a plurality of travel paths, the plurality of travel paths being stored in association with the first feature points around the vehicle;

acquire second feature points around the vehicle in an automatic travel;

compare the first feature points around the vehicle in the parking operation in the past and the second feature points around the vehicle in the automatic travel;

specify a travel path on which the vehicle automatically travels based on a comparison of the first feature points and the second feature points from among the plurality of travel paths stored in the travel path database;

cause the display to display the travel path specified based on the comparison of the first feature points and the second feature points from among the plurality of travel paths stored in the travel path database;

cause the display to display information for urging the driver to approve the specified travel path; and cause the vehicle to automatically travel based on the travel path approved by the driver.

2. The parking assistance device according to claim 1, wherein the processor is further configured to:

detect an object around the vehicle;

correct the specified travel path based on a detection result of the object; and cause, during execution of the automatic travel, the display to display a travel path corrected.

3. The parking assistance device according to claim 2, wherein, when the object was not detected at a time of recording the travel path in the parking operation in the past, the processor is configured to correct the specified travel path such that a distance to the detected object is equal to or greater than a threshold.

4. The parking assistance device according to claim 1, wherein the processor is configured to acquire at least one of the first feature points or the second feature points via a measurement result of a sensor provided in the vehicle and a peripheral image around the vehicle captured by a camera provided in the vehicle.

5. The parking assistance device according to claim 1, wherein the processor is configured to acquire at least one of attribute information of the user of the vehicle, information concerning the driver and a passenger registered in a use schedule of the vehicle, or a user ID capable of specifying the user of the vehicle.

6. The parking assistance device according to claim 5, wherein the attribute information of the user includes at least information concerning one of an age of the user or a physical handicap of the user.

7. The parking assistance device according to claim 1, wherein the processor is further configured to:

acquire the plurality of travel paths from a storage device provided outside the vehicle together with the first feature points stored in association with the plurality of travel paths, wherein the specified travel path is specified based on the comparison of the first feature points and the second feature points from among the plurality of travel paths stored in the storage device.

8. The parking assistance device according to claim 1, wherein the parking operation in the past includes a parking operation by manual driving of the vehicle by the driver.

9. The parking assistance device according to claim 1, wherein the display includes a display of a smartphone.

10. The parking assistance device according to claim 1, wherein the processor is configured to acquire the first feature points around the vehicle from at least one of a wall, a building, or a tree around the vehicle.

11. A parking assistance method causing a vehicle to automatically travel based on a travel path in a parking operation in a past by a driver, the parking assistance method comprising:

registering, by a user using a touch panel of a display, a travel path database;

acquiring first feature points around the vehicle in the parking operation in the past by the driver;

storing, in the travel path database, a plurality of travel paths, the plurality of travel paths being stored in association with the first feature points around the vehicle;

acquiring second feature points around the vehicle in an automatic travel;

comparing the first feature points around the vehicle in the parking operation in the past and the second feature points around the vehicle in the automatic travel;

specifying a travel path on which the vehicle automatically travels based on a comparison of the first feature points and the second feature points from among the plurality of travel paths stored in the travel path database;

causing the display to display the travel path specified based on the comparison of the first feature points and the second feature points from among the plurality of travel paths stored in the travel path database;

causing the display to display information for urging the driver to approve the specified travel path; and causing the vehicle to automatically travel based on the travel path approved by the driver.

12. The parking assistance method according to claim 11, further comprising:

detecting an object around the vehicle; and correcting the specified travel path based on a detection result of the object, wherein the causing the display includes causing, during execution of the automatic travel, the display to display a travel path corrected.

13. The parking assistance method according to claim 12, wherein, when the object was not detected at a time of recording the travel path in the parking operation in the past, the correcting includes correcting the specified travel path such that a distance to the detected object is equal to or greater than a threshold.

14. The parking assistance method according to claim 11, wherein at least one of the first feature points or the second feature points is acquired via a measurement result of a sensor provided in the vehicle and a peripheral image around the vehicle captured by a camera provided in the vehicle.

15. The parking assistance method according to claim 11, further comprising:

acquiring at least one of attribute information of the user of the vehicle, information concerning the driver and a passenger registered in a use schedule of the vehicle, or a user ID capable of specifying the user of the vehicle.

16. The parking assistance method according to claim 15, wherein the attribute information of the user includes at least information concerning one of an age of the user or a physical handicap of the user.

17. The parking assistance method according to claim 11, further comprising:

acquiring the plurality of travel paths from a storage device provided outside the vehicle together with the first feature points stored in association with the plurality of travel paths, wherein the specified travel path is specified based on the comparison of the first feature points and the second feature points from among the plurality of travel paths stored in the storage device.

18. The parking assistance method according to claim 11, wherein the parking operation in the past includes a parking operation by manual driving of the vehicle by the driver.

19. The parking assistance method according to claim 11, wherein the display includes a display of a smartphone.

20. The parking assistance method according to claim 11, wherein the first feature points around the vehicle are acquired from at least one of a wall, a building, or a tree around the vehicle.

* * * * *